United States Patent
Marshall et al.

(10) Patent No.: US 10,783,077 B2
(45) Date of Patent: *Sep. 22, 2020

(54) MANAGING RESOURCES USING RESOURCE EXPIRATION DATA

(71) Applicant: Amazon Technologies, Inc., Seattle, WA (US)

(72) Inventors: Bradley Eugene Marshall, Bainbridge Island, WA (US); Swaminathan Sivasubramanian, Seattle, WA (US); David R. Richardson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,538

(22) Filed: Aug. 2, 2019

(65) Prior Publication Data

US 2019/0354484 A1 Nov. 21, 2019

Related U.S. Application Data

(63) Continuation of application No. 16/179,473, filed on Nov. 2, 2018, now Pat. No. 10,521,348, which is a (Continued)

(51) Int. Cl.
  *G06F 12/0808* (2016.01)
  *G06F 12/12* (2016.01)
  (Continued)

(52) U.S. Cl.
  CPC ...... *G06F 12/0808* (2013.01); *G06F 12/0811* (2013.01); *G06F 12/12* (2013.01);
  (Continued)

(58) Field of Classification Search
  CPC ............ H04L 67/2852; H04L 67/2885; G06F 12/123; G06F 12/0808; G06F 12/0811
  See application file for complete search history.

(56) References Cited

U.S. PATENT DOCUMENTS 5,063,500 A 11/1991 Shorter
5,341,477 A 8/1994 Pitkin et al.
(Continued)

FOREIGN PATENT DOCUMENTS

CA 2741 895 A1 5/2010
CA 2765397 A1 2/2011
(Continued)

OTHER PUBLICATIONS

"Zaman et al., ""Combinatorial Auction-Based Dynamic VM Provisioning and Allocation in Clouds""", Department of Computer Science, Wayne State University, Sep. 2011 http://www.cs.wayne.edu/-dgrosu/pub/ccgrid12-symp.pdf."
(Continued)

*Primary Examiner* — El Hadji M Sall
(74) *Attorney, Agent, or Firm* — Knobbe, Martens, Olson & Bear, LLP

(57) ABSTRACT

Resource management techniques, such as cache optimization, are employed to organize resources within caches such that the most requested content (e.g., the most popular content) is more readily available. A service provider utilizes content expiration data as indicative of resource popularity. As resources are requested, the resources propagate through a cache server hierarchy associated with the service provider. More frequently requested resources are maintained at edge cache servers based on shorter expiration data that is reset with each repeated request. Less frequently requested resources are maintained at higher levels of a cache server
(Continued)

hierarchy based on longer expiration data associated with cache servers higher on the hierarchy.

20 Claims, 9 Drawing Sheets

Related U.S. Application Data continuation of application No. 14/871,872, filed on Sep. 30, 2015, now Pat. No. 10,162,753, which is a continuation of application No. 14/331,067, filed on Jul. 14, 2014, now Pat. No. 9,176,894, which is a continuation of application No. 12/485,783, filed on Jun. 16, 2009, now Pat. No. 8,782,236.

(51) Int. Cl.
*H04L 29/08* (2006.01)
*G06F 12/0811* (2016.01)

(52) U.S. Cl.
CPC ...... *H04L 67/2852* (2013.01); *H04L 67/2885* (2013.01); *G06F 2212/163* (2013.01); *G06F 2212/464* (2013.01)

(56) References Cited

U.S. PATENT DOCUMENTS

| | | |
|---|---|---|
| 5,459,837 A | 10/1995 | Caccavale |
| 5,611,049 A | 3/1997 | Pitts |
| 5,627,889 A | 3/1997 | Eslambolchi |
| 5,701,467 A | 9/1997 | Freeston |
| 5,764,910 A | 6/1998 | Shachar |
| 5,774,660 A | 6/1998 | Brendel et al. |
| 5,852,717 A | 11/1998 | Bhide et al. |
| 5,892,914 A | 4/1999 | Pitts |
| 5,893,116 A | 4/1999 | Simmonds et al. |
| 5,895,462 A | 4/1999 | Toki |
| 5,905,248 A | 4/1999 | Russell et al. |
| 5,933,811 A | 5/1999 | Angles et al. |
| 5,937,427 A | 8/1999 | Shinagawa et al. |
| 5,974,454 A | 8/1999 | Apfel et al. |
| 5,991,306 A | 10/1999 | Burns et al. |
| 5,999,274 A | 11/1999 | Lee et al. |
| 6,006,264 A | 12/1999 | Colby et al. |
| 6,016,512 A | 1/2000 | Huitema |
| 6,026,452 A | 1/2000 | Pitts |
| 6,085,234 A | 1/2000 | Pitts et al. |
| 6,038,601 A | 2/2000 | Lambert et al. |
| 6,052,718 A | 3/2000 | Gifford |
| 6,078,960 A | 4/2000 | Ballard |
| 6,018,619 A | 6/2000 | Allard et al. |
| 6,092,100 A | 7/2000 | Berstis et al. |
| 6,098,096 A | 7/2000 | Tsirigotis et al. |
| 6,108,703 A | 8/2000 | Leighton et al. |
| 6,128,279 A | 10/2000 | O'Neil et al. |
| 6,151,631 A | 10/2000 | Ansell et al. |
| 6,157,942 A | 11/2000 | Chu et al. |
| 6,167,438 A | 12/2000 | Yates et al. |
| 6,167,446 A | 12/2000 | Lister et al. |
| 6,173,316 B1 | 1/2001 | De Boor et al. |
| 6,182,111 B1 | 1/2001 | Inohara et al. |
| 6,182,125 B1 | 1/2001 | Borella et al. |
| 6,185,598 B1 | 1/2001 | Farber et al. |
| 6,192,051 B1 | 2/2001 | Lipman et al. |
| 6,205,475 B1 | 2/2001 | Pitts |
| 6,223,288 B1 | 3/2001 | Byrne |
| 6,223,209 B1 | 4/2001 | Watson |
| 6,243,761 B1 | 4/2001 | Mogul et al. |
| 6,275,496 B1 | 6/2001 | Burns et al. |
| 6,286,043 B1 | 8/2001 | Cuomo et al. |
| 6,286,084 B1 | 9/2001 | Wexler et al. |
| 6,304,913 B1 | 9/2001 | Rune |
| 6,324,580 B1 | 10/2001 | Jindal et al. |
| 6,330,602 B1 | 11/2001 | Law et al. |
| 6,338,082 B1 | 1/2002 | Schneider |
| 6,345,308 B1 | 1/2002 | Abe |
| 6,351,743 B1 | 2/2002 | DeArdo et al. |
| 6,351,775 B1 | 2/2002 | Yu |
| 6,363,411 B1 | 2/2002 | Dugan et al. |
| 6,366,952 B2 | 3/2002 | Pitts |
| 6,374,290 B1 | 4/2002 | Scharber et al. |
| 6,377,257 B1 | 4/2002 | Borrel et al. |
| 6,386,043 B1 | 4/2002 | Millins |
| 6,389,532 B1 | 5/2002 | Gupta et al. |
| 6,405,252 B1 | 5/2002 | Gupta et al. |
| 6,408,360 B1 | 6/2002 | Chamberlain et al. |
| 6,411,967 B1 | 6/2002 | Van Renesse |
| 6,415,280 B1 | 6/2002 | Farber et al. |
| 6,430,607 B1 | 7/2002 | Kavner |
| 6,438,592 B1 | 8/2002 | Killian |
| 6,442,165 B1 | 8/2002 | Sitaraman et al. |
| 6,452,925 B1 | 8/2002 | Sistanizadeh et al. |
| 6,457,047 B1 | 9/2002 | Chandra et al. |
| 6,459,909 B1 | 9/2002 | Bilcliff et al. |
| 6,473,804 B1 | 10/2002 | Kaiser et al. |
| 6,484,143 B1 | 10/2002 | Swildens et al. |
| 6,484,161 B1 | 11/2002 | Chipalkatti et al. |
| 6,493,765 B1 | 11/2002 | Cunningham et al. |
| 6,505,241 B2 | 1/2003 | Pitts |
| 6,513,112 B1 | 1/2003 | Craig et al. |
| 6,523,036 B1 | 1/2003 | Hickman et al. |
| 6,529,910 B1 | 2/2003 | Fleskes |
| 6,529,953 B1 | 3/2003 | Van Renesse |
| 6,553,413 B1 | 3/2003 | Leighton et al. |
| 6,560,610 B1 | 4/2003 | Eatherton et al. |
| 6,611,873 B1 | 5/2003 | Kanehara |
| 6,622,168 B1 | 8/2003 | Datta |
| 6,643,357 B2 | 10/2003 | Lumsden |
| 6,643,707 B1 | 11/2003 | Booth |
| 6,654,807 B2 | 11/2003 | Farber et al. |
| 6,658,462 B1 | 11/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,687,846 B1 | 1/2004 | Adrangi et al. |
| 6,694,358 B1 | 2/2004 | Swildens et al. |
| 6,697,805 B1 | 2/2004 | Choquier et al. |
| 6,718,324 B2 | 3/2004 | Edlund et al. |
| 6,724,770 B1 | 4/2004 | Van Renesse |
| 6,732,237 B1 | 4/2004 | Jacobs et al. |
| 6,754,699 B2 | 5/2004 | Swildens et al. |
| 6,754,706 B1 | 6/2004 | Swildens et al. |
| 6,760,721 B1 | 6/2004 | Chasen et al. |
| 6,769,031 B1 | 7/2004 | Bero |
| 6,782,398 B1 | 7/2004 | Bahl |
| 6,785,704 B1 | 8/2004 | McCanne |
| 6,795,434 B1 | 8/2004 | Kumar et al. |
| 6,799,214 B1 | 9/2004 | Li |
| 6,804,706 B2 | 9/2004 | Pitts |
| 6,810,291 B2 | 10/2004 | Card et al. |
| 6,810,411 B1 | 10/2004 | Coughlin et al. |
| 6,829,654 B1 | 11/2004 | Jungck |
| 6,862,607 B1 | 3/2005 | Vermeulen |
| 6,868,439 B2 | 3/2005 | Basu et al. |
| 6,874,017 B1 | 3/2005 | Inoue et al. |
| 6,917,951 B2 | 3/2005 | Orbits et al. |
| 6,925,499 B1 | 7/2005 | Chen et al. |
| 6,928,467 B2 | 8/2005 | Peng et al. |
| 6,928,485 B1 | 8/2005 | Krishnamurthy et al. |
| 6,941,562 B2 | 8/2005 | Gao et al. |
| 6,944,167 B1 | 9/2005 | McPherson |
| 6,950,848 B1 | 9/2005 | Yousefi'zadeh |
| 6,961,783 B1 | 9/2005 | Cook et al. |
| 6,963,850 B1 | 11/2005 | Bezos et al. |
| 6,968,389 B1 | 11/2005 | Menditto et al. |
| 6,976,090 B2 | 11/2005 | Ben-Shaul et al. |
| 6,981,017 B1 | 12/2005 | Kasriel et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 1/2006 | Leighton et al. |
| 7,003,555 B1 | 2/2006 | Jungck |

(56) References Cited

U.S. PATENT DOCUMENTS

| | | |
|---|---|---|
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,027,582 B2 | 4/2006 | Khello et al. |
| 7,031,445 B2 | 4/2006 | Lumsden |
| 7,032,010 B1 | 4/2006 | Swildens et al. |
| 7,058,633 B1 | 4/2006 | Gnagy et al. |
| 7,058,706 B1 | 6/2006 | Iyer et al. |
| 7,058,953 B2 | 6/2006 | Willard et al. |
| 7,062,158 B1 | 6/2006 | Ayaki |
| 7,065,587 B2 | 6/2006 | Huitema et al. |
| 7,072,982 B2 | 6/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,266 B2 | 8/2006 | Lewin et al. |
| 7,099,936 B2 | 8/2006 | Chase et al. |
| 7,103,645 B2 | 8/2006 | Leighton et al. |
| 7,114,160 B2 | 9/2006 | Suryanarayana et al. |
| 7,117,262 B2 | 9/2006 | Bai et al. |
| 7,133,905 B2 | 10/2006 | Dilley et al. |
| 7,136,922 B2 | 11/2006 | Sundaram et al. |
| 7,139,808 B2 | 11/2006 | Anderson et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 11/2006 | Dang et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,165,117 B1 | 1/2007 | Sitaraman et al. |
| 7,174,382 B2 | 1/2007 | Ramanathan et al. |
| 7,185,046 B2 | 2/2007 | Ferstl et al. |
| 7,185,063 B1 | 2/2007 | Kasriel et al. |
| 7,185,084 B2 | 2/2007 | Sirivara et al. |
| 7,188,214 B1 | 2/2007 | Kasriel et al. |
| 7,194,522 B1 | 3/2007 | Swildens et al. |
| 7,194,552 B1 | 3/2007 | Schneider |
| 7,200,667 B2 | 3/2007 | Teodosiu et al. |
| 7,200,673 B1 | 4/2007 | Augart |
| 7,216,170 B2 | 4/2007 | Ludvig et al. |
| 7,225,254 B1 | 5/2007 | Swildens et al. |
| 7,228,350 B2 | 5/2007 | Hong et al. |
| 7,228,359 B1 | 6/2007 | Monteiro |
| 7,233,978 B2 | 6/2007 | Overton et al. |
| 7,240,100 B1 | 6/2007 | Wein et al. |
| 7,249,196 B1 | 7/2007 | Peiffer et al. |
| 7,251,675 B1 | 7/2007 | Kamakura et al. |
| 7,254,626 B1 | 7/2007 | Kommula et al. |
| 7,272,227 B1 | 7/2007 | Beran |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,274,658 B2 | 9/2007 | Bornstein et al. |
| 7,284,056 B2 | 9/2007 | Ramig |
| 7,289,519 B1 | 10/2007 | Liskov |
| 7,293,093 B2 | 10/2007 | Leighton |
| 7,308,499 B2 | 11/2007 | Chavez |
| 7,310,686 B2 | 12/2007 | Uysal |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,337,968 B2 | 1/2008 | Wilz, Sr. et al. |
| 7,339,937 B2 | 3/2008 | Mitra et al. |
| 7,340,505 B2 | 3/2008 | Lisiecki et al. |
| 7,343,397 B2 | 3/2008 | Kochanski |
| 7,350,075 B1 | 3/2008 | Eastham et al. |
| 7,362,703 B1 | 3/2008 | Taft et al. |
| 7,363,291 B1 | 4/2008 | Page |
| 7,363,626 B2 | 4/2008 | Koutharapu et al. |
| 7,370,089 B2 | 4/2008 | Boyd et al. |
| 7,372,809 B2 | 5/2008 | Chen |
| 7,373,416 B2 | 5/2008 | Kagan et al. |
| 7,376,716 B2 | 5/2008 | Dilley et al. |
| 7,376,736 B2 | 5/2008 | Sundaram et al. |
| 7,380,078 B2 | 5/2008 | Ikegaya et al. |
| 7,389,354 B1 | 5/2008 | Sitaraman et al. |
| 7,392,236 B2 | 6/2008 | Rusch et al. |
| 7,398,301 B2 | 6/2008 | Hennessey et al. |
| 7,406,512 B2 | 7/2008 | Swildens et al. |
| 7,406,522 B2 | 7/2008 | Riddle |
| 7,409,712 B1 | 7/2008 | Brooks et al. |
| 7,430,610 B2 | 8/2008 | Pace et al. |
| 7,441,045 B2 | 9/2008 | Skene et al. |
| 7,441,261 B2 | 10/2008 | Slater et al. |
| 7,451,230 B2 | 10/2008 | Corrado et al. |
| 7,454,457 B1 | 11/2008 | Lowery et al. |
| 7,454,500 B1 | 11/2008 | Hsu et al. |
| 7,461,170 B1 | 11/2008 | Taylor et al. |
| 7,464,142 B2 | 12/2008 | Flurry et al. |
| 7,478,148 B2 | 1/2009 | Neerdaels |
| 7,492,720 B2 | 1/2009 | Pruthi et al. |
| 7,496,651 B1 | 2/2009 | Joshi |
| 7,499,998 B2 | 2/2009 | Toebes et al. |
| 7,502,836 B1 | 3/2009 | Menditto et al. |
| 7,505,464 B2 | 3/2009 | Okmianski et al. |
| 7,506,034 B2 | 3/2009 | Coates et al. |
| 7,519,705 B1 | 3/2009 | Papagiannaki et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 4/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 6/2009 | Lovett et al. |
| 7,565,407 B1 | 7/2009 | Hayball |
| 7,568,032 B2 | 7/2009 | Feng et al. |
| 7,573,916 B1 | 7/2009 | Bechtolsheim et al. |
| 7,574,499 B1 | 8/2009 | Swildens et al. |
| 7,581,009 B1 | 8/2009 | Hsu et al. |
| 7,593,935 B2 | 8/2009 | Sullivan |
| 7,594,189 B1 | 9/2009 | Walker et al. |
| 7,596,619 B2 | 9/2009 | Leighton et al. |
| 7,603,439 B2 | 9/2009 | Dilley et al. |
| 7,613,815 B1 | 10/2009 | Prakash et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,624,264 B2 | 11/2009 | Aura et al. |
| 7,631,101 B2 | 11/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 1/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 2/2010 | Levy et al. |
| 7,680,897 B1 | 3/2010 | Carter et al. |
| 7,684,394 B1 | 3/2010 | Cutbill et al. |
| 7,685,109 B1 | 3/2010 | Ransil et al. |
| 7,685,251 B2 | 3/2010 | Houlihan et al. |
| 7,693,813 B1 | 3/2010 | Cao et al. |
| 7,693,959 B2 | 4/2010 | Leighton et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 4/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 5/2010 | Raciborski et al. |
| 7,739,400 B2 | 6/2010 | Lindbo et al. |
| 7,747,720 B2 | 6/2010 | Toebes et al. |

(56) References Cited

U.S. PATENT DOCUMENTS

| | | |
|---|---|---|
| 7,756,017 B2 | 7/2010 | Goyal et al. |
| 7,756,913 B1 | 7/2010 | Day |
| 7,756,965 B2 | 7/2010 | Joshi |
| 7,757,202 B2 | 7/2010 | Dahlsted et al. |
| 7,761,572 B1 | 7/2010 | Auerbach |
| 7,765,304 B2 | 7/2010 | Davis et al. |
| 7,769,823 B2 | 7/2010 | Jenny et al. |
| 7,773,596 B1 | 8/2010 | Marques |
| 7,774,342 B1 | 8/2010 | Virdy |
| 7,783,727 B1 | 8/2010 | Foley et al. |
| 7,787,380 B1 | 8/2010 | Aggarwal et al. |
| 7,792,989 B2 | 8/2010 | Toebes et al. |
| 7,805,516 B2 | 9/2010 | Kettler et al. |
| 7,809,597 B2 | 9/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 10/2010 | Phillips et al. |
| 7,836,177 B2 | 11/2010 | Kasriel et al. |
| 7,853,719 B1 | 11/2010 | Cao et al. |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 1/2011 | Todd et al. |
| 7,890,989 B1 | 2/2011 | Hofrichter et al. |
| 7,899,899 B2 | 2/2011 | Joshi |
| 7,904,875 B2 | 3/2011 | Hegyi |
| 7,912,921 B2 | 3/2011 | O'Rourke et al. |
| 7,925,782 B2 | 3/2011 | Sivasubramanian et al. |
| 7,925,713 B1 | 4/2011 | Day et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 5/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 6/2011 | Malmskog et al. |
| 7,991,910 B2 | 7/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,001,187 B2 | 8/2011 | Stochosky |
| 8,010,707 B2 | 8/2011 | Elzur et al. |
| 8,019,869 B2 | 8/2011 | Kriegsman |
| 8,024,441 B2 | 9/2011 | Kommula et al. |
| 8,028,090 B2 | 9/2011 | Richardson et al. |
| 8,041,773 B2 | 9/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,065,275 B2 | 11/2011 | Eriksen et al. |
| 8,069,231 B2 | 11/2011 | Schran et al. |
| 8,073,940 B1 | 11/2011 | Richardson et al. |
| 8,082,348 B1 | 12/2011 | Averbuj et al. |
| 8,099,487 B1 | 1/2012 | Smirnov et al. |
| 8,108,623 B2 | 1/2012 | Krishnaprasad et al. |
| 8,117,306 B1 | 1/2012 | Baumback et al. |
| 8,122,098 B1 | 2/2012 | Richardson et al. |
| 8,122,124 B1 | 2/2012 | Baumback et al. |
| 8,132,242 B1 | 2/2012 | Wu |
| 8,135,820 B2 | 3/2012 | Richardson et al. |
| 8,155,126 B1 | 3/2012 | Mao et al. |
| 8,156,199 B1 | 4/2012 | Hoche-Mong et al. |
| 8,156,243 B2 | 4/2012 | Richardson et al. |
| 8,161,184 B2 | 4/2012 | Sekar et al. |
| 8,175,863 B1 | 4/2012 | Ostermeyer et al. |
| 8,180,720 B1 | 5/2012 | Kovacs et al. |
| 8,190,682 B2 | 5/2012 | Paterson-Jones et al. |
| 8,195,605 B2 | 5/2012 | Chellappa et al. |
| 8,195,837 B2 | 6/2012 | McCarthy et al. |
| 8,209,695 B1 | 6/2012 | Pruyne et al. |
| 8,224,971 B1 | 6/2012 | Miller et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 7/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,260,914 B1 | 8/2012 | Ranjan |
| 8,261,062 B2 | 9/2012 | Aura et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 9/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,296,393 B2 | 10/2012 | Alexander et al. |
| 8,296,786 B2 | 10/2012 | Faust et al. |
| 8,301,600 B1 | 10/2012 | Helmick et al. |
| 8,301,645 B1 | 10/2012 | Crook |
| 8,321,568 B2 | 11/2012 | Sivasubramanian et al. |
| 8,321,588 B2 | 11/2012 | Richardson et al. |
| 8,356,074 B1 | 1/2013 | Ehrlich et al. |
| 8,380,831 B2 | 1/2013 | Barber |
| 8,380,851 B2 | 2/2013 | McCarthy et al. |
| 8,392,928 B1 | 2/2013 | Forys et al. |
| 8,396,908 B2 | 3/2013 | Moore et al. |
| 8,402,137 B2 | 3/2013 | Sivasuramanian et al. |
| 8,423,408 B1 | 3/2013 | Barnes et al. |
| 8,423,662 B1 | 4/2013 | Weihl et al. |
| 8,433,749 B2 | 4/2013 | Wee et al. |
| 8,443,167 B1 | 4/2013 | Fallone et al. |
| 8,447,831 B1 | 5/2013 | Sivasubramanian et al. |
| 8,447,876 B2 | 5/2013 | Verma et al. |
| 8,452,745 B2 | 5/2013 | Ramakrishna |
| 8,452,874 B2 | 5/2013 | MacCarthaigh et al. |
| 8,463,877 B1 | 5/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 6/2013 | Farber et al. |
| 8,478,883 B2 | 7/2013 | Day et al. |
| 8,504,721 B2 | 7/2013 | Hsu et al. |
| 8,510,428 B2 | 8/2013 | Joshi |
| 8,510,807 B1 | 8/2013 | Elazary et al. |
| 8,516,082 B2 | 8/2013 | Cadwell et al. |
| 8,521,851 B1 | 8/2013 | Richardson et al. |
| 8,521,876 B2 | 8/2013 | Goodman et al. |
| 8,521,880 B1 | 8/2013 | Richardson et al. |
| 8,521,885 B1 | 8/2013 | Richardson et al. |
| 8,521,908 B2 | 8/2013 | Holmes et al. |
| 8,526,405 B2 | 8/2013 | Curtis et al. |
| 8,527,639 B1 | 9/2013 | Liskov et al. |
| 8,527,645 B1 | 9/2013 | Proffit et al. |
| 8,527,658 B2 | 9/2013 | Holmes et al. |
| 8,549,646 B2 | 9/2013 | Stavrou et al. |
| 8,572,208 B2 | 10/2013 | Farber et al. |
| 8,572,210 B2 | 10/2013 | Farber et al. |
| 8,577,992 B1 | 10/2013 | Richardson et al. |
| 8,589,996 B2 | 11/2013 | Ma et al. |
| 8,606,996 B2 | 11/2013 | Richardson et al. |
| 8,612,565 B2 | 12/2013 | Schneider |
| 8,615,549 B2 | 12/2013 | Knowles et al. |
| 8,619,780 B1 | 12/2013 | Brandwine |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 1/2014 | McCarthy et al. |
| 8,645,700 B2 | 2/2014 | Smith et al. |
| 8,676,918 B2 | 3/2014 | Richardson et al. |
| 8,683,023 B1 | 3/2014 | Brandwine et al. |
| 8,683,076 B2 | 3/2014 | Farber et al. |
| 8,688,837 B1 | 3/2014 | Richardson et al. |
| 8,712,950 B2 | 4/2014 | Smith et al. |
| 8,732,309 B1 | 4/2014 | Richardson et al. |

(56) References Cited

U.S. PATENT DOCUMENTS

| | | |
|---|---|---|
| 8,745,177 B1 | 5/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,775,553 B2 | 6/2014 | Cansino et al. |
| 8,782,207 B2 | 7/2014 | Qiu et al. |
| 8,782,236 B1 | 7/2014 | Marshall et al. |
| 8,782,279 B2 | 7/2014 | Eggleston et al. |
| 8,788,671 B2 | 7/2014 | Richardson et al. |
| 8,812,727 B1 | 8/2014 | Sorenson, III et al. |
| 8,819,283 B2 | 8/2014 | Richardson et al. |
| 8,826,032 B1 | 8/2014 | Yahalom et al. |
| 8,904,009 B1 | 12/2014 | Marshall et al. |
| 8,914,514 B1 | 12/2014 | Jenkins et al. |
| 8,914,626 B1 | 12/2014 | Adogla et al. |
| 8,914,797 B2 | 12/2014 | Osogami et al. |
| 8,914,814 B1 | 12/2014 | Middleton et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,935,744 B2 | 1/2015 | Osterweil et al. |
| 8,938,526 B1 | 1/2015 | Richardson et al. |
| 8,949,161 B2 | 1/2015 | Borst et al. |
| 8,949,459 B1 | 2/2015 | Scholl |
| 8,966,318 B1 | 2/2015 | Shah |
| 8,972,580 B2 | 3/2015 | Fleischman et al. |
| 8,976,711 B2 | 3/2015 | Li et al. |
| 9,003,035 B1 | 3/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 4/2015 | Sivasubramanian et al. |
| 9,037,975 B1 | 5/2015 | Taylor et al. |
| 9,075,777 B1 | 6/2015 | Pope et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,106,701 B2 | 7/2015 | Richardson et al. |
| 9,116,803 B1 | 8/2015 | Agrawal et al. |
| 9,118,680 B1 | 8/2015 | Dunlap et al. |
| 9,130,756 B2 | 8/2015 | Richardson et al. |
| 9,130,977 B2 | 9/2015 | Zisapel et al. |
| 9,137,210 B1 | 9/2015 | Joglekar et al. |
| 9,137,301 B1 | 9/2015 | Dunlap et al. |
| 9,137,302 B1 | 9/2015 | Makhijani et al. |
| 9,154,551 B1 | 9/2015 | Watson |
| 9,160,703 B2 | 10/2015 | Richardson et al. |
| 9,172,674 B1 | 10/2015 | Patel et al. |
| 9,176,894 B2 | 10/2015 | Marshall et al. |
| 9,185,012 B2 | 11/2015 | Richardson et al. |
| 9,191,338 B2 | 11/2015 | Richardson et al. |
| 9,191,458 B2 | 11/2015 | Richardson et al. |
| 9,195,996 B1 | 11/2015 | Walsh et al. |
| 9,208,097 B2 | 11/2015 | Richardson et al. |
| 9,210,235 B2 | 12/2015 | Sivasubramanian et al. |
| 9,219,686 B2 | 12/2015 | Hilt et al. |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,253,065 B2 | 1/2016 | Richardson et al. |
| 9,251,112 B2 | 2/2016 | Richardson et al. |
| 9,276,812 B1 | 2/2016 | Nagargadde et al. |
| 9,294,391 B1 | 3/2016 | Mostert |
| 9,323,577 B2 | 3/2016 | Marr et al. |
| 9,332,078 B2 | 4/2016 | Sivasubramanian et al. |
| 9,386,038 B2 | 6/2016 | Martini |
| 9,391,949 B1 | 7/2016 | Richardson et al. |
| 9,407,676 B2 | 7/2016 | Archer et al. |
| 9,407,539 B1 | 8/2016 | Dickinson et al. |
| 9,407,681 B1 | 8/2016 | Richardson et al. |
| 9,407,699 B2 | 8/2016 | Sivasubramanian et al. |
| 9,444,718 B2 | 8/2016 | Khakpour et al. |
| 9,444,759 B2 | 9/2016 | Richardson et al. |
| 9,479,476 B2 | 9/2016 | Richardson et al. |
| 9,495,338 B1 | 11/2016 | Hollis et al. |
| 9,497,259 B1 | 11/2016 | Richardson et al. |
| 9,515,949 B2 | 11/2016 | Richardson et al. |
| 9,525,659 B1 | 12/2016 | Sonkin et al. |
| 9,544,394 B2 | 1/2017 | Richardson et al. |
| 9,571,389 B2 | 1/2017 | Richardson et al. |
| 9,584,328 B1 | 2/2017 | Graham-cumming |
| 9,590,946 B2 | 2/2017 | Richardson et al. |
| 9,608,957 B2 | 3/2017 | Sivasubramanian et al. |
| 9,621,660 B2 | 3/2017 | Sivasubramanian et al. |
| 9,628,509 B2 | 4/2017 | Holloway et al. |
| 9,628,554 B2 | 4/2017 | Marshall et al. |
| 9,645,808 B1 | 4/2017 | Turpie |
| 9,703,713 B2 | 5/2017 | Nadgowda |
| 9,705,922 B2 | 7/2017 | Foxhoven et al. |
| 9,712,325 B2 | 7/2017 | Richardson et al. |
| 9,712,484 B1 | 7/2017 | Richardson et al. |
| 9,734,472 B2 | 7/2017 | Richardson et al. |
| 9,742,795 B1 | 8/2017 | Radlein et al. |
| 9,760,420 B1 | 8/2017 | Letz et al. |
| 9,774,619 B1 | 9/2017 | Radlein et al. |
| 9,787,599 B2 | 9/2017 | Richardson et al. |
| 9,787,775 B1 | 10/2017 | Richardson et al. |
| 9,794,216 B2 | 10/2017 | Richardson et al. |
| 9,794,281 B1 | 10/2017 | Radlein et al. |
| 9,800,539 B2 | 10/2017 | Richardson et al. |
| 9,811,451 B1 | 10/2017 | Arguelles et al. |
| 9,819,567 B1 | 11/2017 | Uppal et al. |
| 9,832,141 B1 | 11/2017 | Raftery |
| 9,871,794 B2 | 1/2018 | Joffe et al. |
| 9,887,914 B2 | 1/2018 | Bergman |
| 9,887,915 B2 | 2/2018 | Richardson et al. |
| 9,887,931 B1 | 2/2018 | Uppal et al. |
| 9,887,932 B1 | 2/2018 | Uppal et al. |
| 9,888,089 B2 | 2/2018 | Sivasubramanian et al. |
| 9,893,957 B2 | 2/2018 | Ellsworth et al. |
| 9,894,168 B2 | 2/2018 | Sivasubramanian et al. |
| 9,900,402 B1 | 2/2018 | Li et al. |
| 9,912,740 B2 | 2/2018 | Richardson et al. |
| 9,929,959 B2 | 3/2018 | Mostert |
| 9,930,131 B2 | 3/2018 | MacCarthaigh et al. |
| 9,954,934 B2 | 3/2018 | Sivasubramanian et al. |
| 9,985,927 B2 | 4/2018 | Richardson et al. |
| 9,992,086 B1 | 5/2018 | Mizik et al. |
| 9,992,303 B2 | 6/2018 | Richardson et al. |
| 10,015,237 B2 | 7/2018 | Richardson et al. |
| 10,015,241 B2 | 7/2018 | Marr et al. |
| 10,021,179 B1 | 7/2018 | Velummylum et al. |
| 10,027,582 B2 | 7/2018 | Richardson et al. |
| 10,033,627 B1 | 7/2018 | Howard et al. |
| 10,033,691 B1 | 7/2018 | Mizik et al. |
| 10,033,699 B2 | 7/2018 | Sullivan et al. |
| 10,049,051 B1 | 8/2018 | Baldwin |
| 10,075,551 B1 | 9/2018 | Baldwin et al. |
| 10,079,742 B1 | 9/2018 | Richardson et al. |
| 10,091,096 B1 | 10/2018 | Howard et al. |
| 10,097,398 B1 | 10/2018 | Richardson et al. |
| 10,097,448 B1 | 10/2018 | Howard et al. |
| 10,097,566 B1 | 10/2018 | Radlein et al. |
| 10,110,694 B1 | 10/2018 | Watson et al. |
| 10,116,584 B2 | 10/2018 | Richardson et al. |
| 10,135,620 B2 | 11/2018 | Richardson et al. |
| 10,157,135 B2 | 12/2018 | Richardson et al. |
| 10,158,729 B2 | 12/2018 | Sivasubramanian et al. |
| 10,162,753 B2 | 12/2018 | Marshall et al. |
| 10,180,993 B2 | 1/2019 | Raftery |
| 10,200,402 B2 | 2/2019 | Radlein et al. |
| 10,200,492 B2 | 2/2019 | MacCarthaigh et al. |
| 10,205,698 B1 | 2/2019 | Petersen et al. |
| 10,218,584 B2 | 2/2019 | Ellsworth et al. |
| 10,225,322 B2 | 3/2019 | Richardson et al. |
| 10,225,326 B1 | 3/2019 | Puchala et al. |
| 10,225,362 B2 | 3/2019 | Watson |
| 10,230,819 B2 | 3/2019 | Richardson et al. |
| 10,257,307 B1 | 4/2019 | Baldwin |
| 10,264,062 B2 | 4/2019 | Richardson et al. |

(56) References Cited

U.S. PATENT DOCUMENTS

| | | |
|---|---|---|
| 10,270,878 B1 | 4/2019 | Uppal et al. |
| 10,305,797 B2 | 5/2019 | Richardson et al. |
| 10,348,639 B2 | 7/2019 | Puchala et al. |
| 10,374,955 B2 | 8/2019 | Mostert |
| 10,447,648 B2 | 10/2019 | Bliss et al. |
| 10,467,042 B1 | 11/2019 | Mercier et al. |
| 10,469,355 B2 | 11/2019 | Uppal et al. |
| 10,469,513 B2 | 11/2019 | Uppal et al. |
| 10,491,534 B2 | 11/2019 | Richardson et al. |
| 10,505,961 B2 | 12/2019 | Uppal et al. |
| 10,506,029 B2 | 12/2019 | Hollis et al. |
| 10,511,567 B2 | 12/2019 | Richardson et al. |
| 10,516,590 B2 | 12/2019 | Mizik et al. |
| 10,521,348 B2 | 12/2019 | Marshall et al. |
| 10,523,783 B2 | 12/2019 | Richardson et al. |
| 10,530,874 B2 | 1/2020 | Sivasubramanian et al. |
| 10,542,079 B2 | 1/2020 | Marr et al. |
| 10,554,748 B2 | 2/2020 | Sivasubramanian et al. |
| 10,574,787 B2 | 2/2020 | Richardson et al. |
| 10,601,767 B2 | 3/2020 | Richardson et al. |
| 10,616,250 B2 | 4/2020 | Uppal et al. |
| 10,623,408 B1 | 4/2020 | Marshall et al. |
| 2001/0000811 A1 | 5/2001 | May et al. |
| 2001/0025305 A1 | 9/2001 | Yoshiasa et al. |
| 2001/0027479 A1 | 10/2001 | Delaney et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004816 A1 | 1/2002 | Vange et al. |
| 2002/0004846 A1 | 1/2002 | Garcia-Luna-Aceves et al. |
| 2002/0007413 A1 | 1/2002 | Garcia-Luna-Aceves et al. |
| 2002/0010783 A1 | 1/2002 | Primak et al. |
| 2002/0010798 A1 | 1/2002 | Ben-Shaul et al. |
| 2002/0016831 A1 | 2/2002 | Peled et al. |
| 2002/0035624 A1 | 3/2002 | Kim |
| 2002/0048269 A1 | 4/2002 | Hong et al. |
| 2002/0049608 A1 | 4/2002 | Hartsell et al. |
| 2002/0049842 A1 | 4/2002 | Huetsch et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0065910 A1 | 5/2002 | Dutta |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083178 A1 | 6/2002 | Brothers |
| 2002/0083198 A1 | 6/2002 | Kim et al. |
| 2002/0087374 A1 | 7/2002 | Boubez et al. |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |
| 2002/0112123 A1 | 8/2002 | Becker et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0138649 A1 | 9/2002 | Cartmell et al. |
| 2002/0143675 A1 | 10/2002 | Orshan |
| 2002/0143798 A1 | 10/2002 | Lisiecki et al. |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0004998 A1 | 1/2003 | Datta |
| 2003/0005036 A1 | 1/2003 | Mitzenmacher |
| 2003/0005111 A1 | 1/2003 | Allan |
| 2003/0007482 A1 | 1/2003 | Khello et al. |
| 2003/0009488 A1 | 1/2003 | Hart, III |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0037284 A1 | 2/2003 | Srinivasan et al. |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0070096 A1 | 4/2003 | Pazi et al. |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0105829 A1 | 6/2003 | Hayward |
| 2003/0105857 A1 | 6/2003 | Kamen et al. |
| 2003/0112792 A1 | 6/2003 | Cranor et al. |
| 2003/0120741 A1 | 6/2003 | Wu et al. |
| 2003/0126387 A1 | 7/2003 | Watanabe |
| 2003/0133554 A1 | 7/2003 | Nykanen et al. |
| 2003/0135467 A1 | 7/2003 | Okamoto |
| 2003/0135509 A1 | 7/2003 | Davis et al. |
| 2003/0140087 A1 | 7/2003 | Lincoln et al. |
| 2003/0145038 A1 | 7/2003 | Bin Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0177321 A1 | 9/2003 | Watanabe |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |

(56) References Cited

U.S. PATENT DOCUMENTS

| | | |
|---|---|---|
| 2003/0200394 A1 | 10/2003 | Ashmore et al. |
| 2003/0204602 A1 | 10/2003 | Hudson et al. |
| 2003/0206520 A1 | 11/2003 | Wu et al. |
| 2003/0221000 A1 | 11/2003 | Cherkasova et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010562 A1 | 1/2004 | Itonaga |
| 2004/0010563 A1 | 1/2004 | Forte et al. |
| 2004/0010588 A1 | 1/2004 | Slater et al. |
| 2004/0010601 A1 | 1/2004 | Afergan et al. |
| 2004/0010621 A1 | 1/2004 | Afergan et al. |
| 2004/0010683 A1 | 1/2004 | Huitema |
| 2004/0015584 A1 | 1/2004 | Cartmell et al. |
| 2004/0019518 A1 | 1/2004 | Abraham et al. |
| 2004/0024841 A1 | 1/2004 | Becker et al. |
| 2004/0030620 A1 | 2/2004 | Benjamin et al. |
| 2004/0032278 A1 | 2/2004 | Orii et al. |
| 2004/0034744 A1 | 2/2004 | Karlsson et al. |
| 2004/0039798 A1 | 2/2004 | Hotz et al. |
| 2004/0044731 A1 | 2/2004 | Chen et al. |
| 2004/0044791 A1 | 3/2004 | Pouzzner |
| 2004/0054757 A1 | 3/2004 | Ueda et al. |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |
| 2004/0073596 A1 | 4/2004 | Kloninger et al. |
| 2004/0073707 A1 * | 4/2004 | Dillon .............. H04L 29/12009 709/245 |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0105544 A1 | 4/2004 | Haneda et al. |
| 2004/0098478 A1 | 5/2004 | Koetke et al. |
| 2004/0114579 A1 | 6/2004 | Karaoguz et al. |
| 2004/0117309 A1 | 6/2004 | Inoue et al. |
| 2004/0117455 A1 | 6/2004 | Kaminksy et al. |
| 2004/0128344 A1 | 6/2004 | Trossen |
| 2004/0128346 A1 | 7/2004 | Melamed et al. |
| 2004/0148520 A1 | 7/2004 | Talpade et al. |
| 2004/0167981 A1 | 7/2004 | Douglas et al. |
| 2004/0167982 A1 | 8/2004 | Cohen et al. |
| 2004/0170379 A1 | 8/2004 | Yao et al. |
| 2004/0172466 A1 | 9/2004 | Douglas et al. |
| 2004/0184456 A1 | 9/2004 | Binding et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 10/2004 | Swildens et al. |
| 2004/0221034 A1 | 11/2004 | Kausik et al. |
| 2004/0246948 A1 | 11/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0015471 A1 | 1/2005 | Zhang et al. |
| 2005/0021706 A1 | 1/2005 | Maggi et al. |
| 2005/0021862 A1 | 1/2005 | Schroeder et al. |
| 2005/0027882 A1 | 1/2005 | Sullivan et al. |
| 2005/0038967 A1 | 2/2005 | Umbehocker et al. |
| 2005/0039019 A1 | 2/2005 | Delany |
| 2005/0044270 A1 | 2/2005 | Grove et al. |
| 2005/0102683 A1 | 4/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 5/2005 | Lumsden |
| 2005/0132083 A1 | 6/2005 | Raciborski et al. |
| 2005/0147088 A1 | 6/2005 | Bao et al. |
| 2005/0149529 A1 | 7/2005 | Gutmans |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 7/2005 | Kobashi et al. |
| 2005/0171959 A1 | 8/2005 | Deforche et al. |
| 2005/0172080 A1 | 8/2005 | Miyauchi |
| 2005/0174989 A1 | 8/2005 | Chen et al. |
| 2005/0181769 A1 | 8/2005 | Kogawa |
| 2005/0188073 A1 | 8/2005 | Nakamichi et al. |
| 2005/0192814 A1 | 8/2005 | Challener et al. |
| 2005/0192008 A1 | 9/2005 | Desai et al. |
| 2005/0198170 A1 | 9/2005 | LeMay et al. |
| 2005/0198200 A1 | 9/2005 | Subramanian et al. |
| 2005/0198303 A1 | 9/2005 | Knauerhase et al. |
| 2005/0198334 A1 | 9/2005 | Farber et al. |
| 2005/0198453 A1 | 9/2005 | Osaki |
| 2005/0198571 A1 | 9/2005 | Kramer et al. |
| 2005/0201302 A1 | 9/2005 | Gaddis et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 10/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 11/2005 | Agrawal et al. |
| 2005/0267928 A1 | 12/2005 | Anderson et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2005/0286564 A1 | 12/2005 | Hatley et al. |
| 2006/0005014 A1 | 1/2006 | Aura et al. |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0021001 A1 | 1/2006 | Giles et al. |
| 2006/0026067 A1 | 1/2006 | Nicholas et al. |
| 2006/0026154 A1 | 2/2006 | Altinel et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0045005 A1 | 2/2006 | Blackmore et al. |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0070060 A1 | 3/2006 | Tantawi et al. |
| 2006/0074750 A1 | 3/2006 | Clark et al. |
| 2006/0075084 A1 | 4/2006 | Lyon |

(56) References Cited

U.S. PATENT DOCUMENTS

| | | |
|---|---|---|
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0106938 A1 | 4/2006 | Dini et al. |
| 2006/0107036 A1 | 5/2006 | Randle et al. |
| 2006/0112066 A1 | 5/2006 | Hamzy |
| 2006/0112176 A1 | 5/2006 | Liu et al. |
| 2006/0120385 A1 | 5/2006 | Atchison et al. |
| 2006/0129665 A1 | 6/2006 | Toebes et al. |
| 2006/0129766 A1 | 6/2006 | Cassia et al. |
| 2006/0136453 A1 | 6/2006 | Kwan |
| 2006/0143293 A1 | 6/2006 | Freedman |
| 2006/0143442 A1 | 6/2006 | Smith |
| 2006/0146820 A1 | 6/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0173957 A1 | 7/2006 | Robinson |
| 2006/0179080 A1 | 8/2006 | Meek et al. |
| 2006/0184936 A1 | 8/2006 | Abels et al. |
| 2006/0188097 A1 | 8/2006 | Taniguchi et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 8/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0221971 A1 | 9/2006 | Andrieux et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0242227 A1 | 10/2006 | Rao |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 11/2006 | Lewin et al. |
| 2006/0288119 A1 | 12/2006 | Kim et al. |
| 2006/0288424 A1 | 12/2006 | Saito |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 1/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043667 A1 | 2/2007 | Qawami et al. |
| 2007/0043859 A1 | 2/2007 | Ruul |
| 2007/0050522 A1 | 2/2007 | Grove et al. |
| 2007/0050703 A1 | 3/2007 | Lebel |
| 2007/0055764 A1 | 3/2007 | Dilley et al. |
| 2007/0055765 A1 | 3/2007 | Lisiecki et al. |
| 2007/0061440 A1 | 3/2007 | Sundaram et al. |
| 2007/0064610 A1 | 3/2007 | Khandani |
| 2007/0076872 A1 | 3/2007 | Juneau |
| 2007/0086429 A1 | 4/2007 | Lawrence et al. |
| 2007/0094361 A1 | 4/2007 | Hoynowski et al. |
| 2007/0101377 A1 | 4/2007 | Six et al. |
| 2007/0101061 A1 | 5/2007 | Baskaran et al. |
| 2007/0118667 A1 | 5/2007 | McCarthy et al. |
| 2007/0118668 A1 | 5/2007 | McCarthy et al. |
| 2007/0134641 A1 | 5/2007 | Lieu |
| 2007/0156726 A1 | 6/2007 | Levy |
| 2007/0156919 A1 | 7/2007 | Potti et al. |
| 2007/0162331 A1 | 7/2007 | Sullivan |
| 2007/0168336 A1 | 7/2007 | Ransil et al. |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 7/2007 | Wong et al. |
| 2007/0198982 A1 | 8/2007 | Bolan et al. |
| 2007/0204107 A1 | 8/2007 | Greenfield et al. |
| 2007/0208737 A1 | 8/2007 | Li et al. |
| 2007/0214232 A1 | 9/2007 | Belimpasakis et al. |
| 2007/0219795 A1 | 9/2007 | Park et al. |
| 2007/0220010 A1 | 9/2007 | Ertugrul |
| 2007/0226294 A1 | 9/2007 | Pruitt et al. |
| 2007/0233705 A1 | 9/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0233896 A1 | 10/2007 | Hilt et al. |
| 2007/0242824 A1 | 10/2007 | Vishik |
| 2007/0243860 A1 | 10/2007 | Aiello et al. |
| 2007/0244964 A1 | 10/2007 | Challenger et al. |
| 2007/0245022 A1 | 10/2007 | Olliphant et al. |
| 2007/0250467 A1 | 10/2007 | Mesnik et al. |
| 2007/0250468 A1 | 10/2007 | Pieper |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 10/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280197 A1 | 11/2007 | Pearlman et al. |
| 2007/0280229 A1 | 12/2007 | Kenney |
| 2007/0281689 A1 | 12/2007 | Altman et al. |
| 2007/0288588 A1 | 12/2007 | Wein et al. |
| 2007/0291739 A1 | 12/2007 | Sullivan et al. |
| 2007/0294419 A1 | 12/2007 | Ulevitch |
| 2008/0005057 A1 | 1/2008 | Ozzie et al. |
| 2008/0008089 A1 | 1/2008 | Bornstein et al. |
| 2008/0016233 A1 | 1/2008 | Schneider |
| 2008/0222647 A1 | 1/2008 | Taylor et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0049615 A1 | 2/2008 | Bugenhagen |
| 2008/0056207 A1 | 2/2008 | Eriksson et al. |
| 2008/0062997 A1 | 3/2008 | Nix |
| 2008/0065724 A1 | 3/2008 | Seed et al. |
| 2008/0065745 A1 | 3/2008 | Leighton et al. |
| 2008/0066072 A1 | 3/2008 | Yurekli et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 3/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0101358 A1 | 4/2008 | Van Ewijk et al. |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |

(56) References Cited

U.S. PATENT DOCUMENTS

| | | |
|---|---|---|
| 2008/0126706 A1 | 5/2008 | Newport et al. |
| 2008/0134043 A1 | 5/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0162667 A1 | 6/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 7/2008 | Halley |
| 2008/0201332 A1 | 8/2008 | Souders et al. |
| 2008/0025304 A1 | 9/2008 | Venkataswami et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0225779 A1 | 9/2008 | Bragiel et al. |
| 2008/0228574 A1 | 9/2008 | Stewart et al. |
| 2008/0228920 A1 | 9/2008 | Souders et al. |
| 2008/0235383 A1 | 9/2008 | Schneider |
| 2008/0235400 A1 | 9/2008 | Slocombe et al. |
| 2008/0256087 A1 | 10/2008 | Piironen et al. |
| 2008/0256175 A1 | 10/2008 | Lee et al. |
| 2008/0263135 A1 | 10/2008 | Olliphant |
| 2008/0270882 A1 | 10/2008 | Rollins et al. |
| 2008/0275772 A1 | 10/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 11/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0043900 A1 | 2/2009 | Barber |
| 2009/0049098 A1 | 2/2009 | Pickelsimer et al. |
| 2009/0063038 A1 | 2/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0086728 A1 | 3/2009 | Gulati et al. |
| 2009/0086741 A1 | 4/2009 | Zhang |
| 2009/0089869 A1 | 4/2009 | Varghese |
| 2009/0094252 A1 | 4/2009 | Wong et al. |
| 2009/0103707 A1 | 4/2009 | McGary et al. |
| 2009/0106202 A1 | 4/2009 | Mizrahi |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132640 A1 | 5/2009 | Verma et al. |
| 2009/0132648 A1 | 5/2009 | Swildens et al. |
| 2009/0138533 A1 | 5/2009 | Iwasaki et al. |
| 2009/0138582 A1 | 5/2009 | Turk |
| 2009/0144411 A1 | 5/2009 | Winkler et al. |
| 2009/0144412 A1 | 6/2009 | Ferguson et al. |
| 2009/0150926 A1 | 6/2009 | Schlack |
| 2009/0157504 A1 | 6/2009 | Braemer et al. |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 6/2009 | Ramos et al. |
| 2009/0172167 A1 | 7/2009 | Drai et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 7/2009 | Sundaram et al. |
| 2009/0204682 A1 | 8/2009 | Jeyaseelan et al. |
| 2009/0210549 A1 | 8/2009 | Hudson et al. |
| 2009/0228708 A1 | 8/2009 | Trostle |
| 2009/0233623 A1 | 9/2009 | Johnson |
| 2009/0241167 A1 | 9/2009 | Moore |
| 2009/0248697 A1 | 9/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0265707 A1 | 10/2009 | Goodman et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 10/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 11/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0020699 A1 | 1/2010 | On |
| 2010/0023601 A1 | 1/2010 | Lewin et al. |
| 2010/0023621 A1 | 1/2010 | Ezolt et al. |
| 2010/0030662 A1 | 1/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0049862 A1 | 2/2010 | Dixon |
| 2010/0057894 A1 | 2/2010 | Glasser |
| 2010/0058352 A1 | 3/2010 | Esfahany et al. |
| 2010/0070603 A1 | 3/2010 | Moss et al. |
| 2010/0070700 A1 | 3/2010 | Borst et al. |
| 2010/0074268 A1 | 3/2010 | Raza |
| 2010/0082320 A1 | 3/2010 | Wood et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0103837 A1 | 4/2010 | Jungck et al. |
| 2010/0106934 A1 | 4/2010 | Calder et al. |
| 2010/0111059 A1 | 4/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 5/2010 | Sullivan et al. |
| 2010/0150155 A1 | 6/2010 | Napierala |
| 2010/0161564 A1 | 6/2010 | Lee et al. |
| 2010/0161565 A1 | 6/2010 | Lee et al. |

(56) References Cited

U.S. PATENT DOCUMENTS

| | | |
|---|---|---|
| 2010/0161799 A1 | 6/2010 | Maloo |
| 2010/0169392 A1 | 6/2010 | Lev Ran et al. |
| 2010/0169452 A1 | 7/2010 | Atluri et al. |
| 2010/0174811 A1 | 7/2010 | Musiri et al. |
| 2010/0191854 A1 | 7/2010 | Isci et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1 | 8/2010 | Wei |
| 2010/0226372 A1 | 9/2010 | Watanabe |
| 2010/0228819 A1 | 9/2010 | Wei |
| 2010/0257024 A1 | 9/2010 | Holmes et al. |
| 2010/0257266 A1 | 10/2010 | Holmes et al. |
| 2010/0257566 A1 | 10/2010 | Matila |
| 2010/0262964 A1 | 10/2010 | Uyeda et al. |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 10/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0306382 A1 | 11/2010 | Cardosa et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1 | 12/2010 | Colglazier et al. |
| 2010/0332595 A1 | 12/2010 | Fullagar et al. |
| 2010/0332658 A1 | 12/2010 | Elyashev |
| 2011/0010244 A1 | 1/2011 | Hatridge |
| 2011/0016214 A1 | 1/2011 | Jackson |
| 2011/0029598 A1 | 1/2011 | Arnold et al. |
| 2011/0035469 A1 | 2/2011 | Smith et al. |
| 2011/0040893 A1 | 2/2011 | Karaoguz et al. |
| 2011/0051738 A1 | 2/2011 | Xu |
| 2011/0055386 A1 | 3/2011 | Middleton et al. |
| 2011/0055714 A1 | 3/2011 | Vemulapalli et al. |
| 2011/0055921 A1 | 3/2011 | Narayanaswamy et al. |
| 2011/0057790 A1 | 3/2011 | Martin et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 3/2011 | Jana et al. |
| 2011/0082916 A1 | 4/2011 | Swanson et al. |
| 2011/0087769 A1 | 4/2011 | Holmes et al. |
| 2011/0093584 A1 | 4/2011 | Qiu et al. |
| 2011/0096987 A1 | 4/2011 | Morales et al. |
| 2011/0106949 A1 | 4/2011 | Patel et al. |
| 2011/0113467 A1 | 5/2011 | Agarwal et al. |
| 2011/0125894 A1 | 5/2011 | Anderson et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0154350 A1 | 6/2011 | Doyle et al. |
| 2011/0161461 A1 | 6/2011 | Niven-Jenkins |
| 2011/0166935 A1 | 6/2011 | Armentrout et al. |
| 2011/0182290 A1 | 7/2011 | Perkins |
| 2011/0191445 A1 | 7/2011 | Dazzi |
| 2011/0191446 A1 | 8/2011 | Dazzi et al. |
| 2011/0191447 A1 | 8/2011 | Dazzi et al. |
| 2011/0191449 A1 | 8/2011 | Swildens et al. |
| 2011/0191459 A1 | 8/2011 | Joshi |
| 2011/0196892 A1 | 8/2011 | Xia |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 8/2011 | Farber et al. |
| 2011/0219372 A1 | 9/2011 | Agarwal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 9/2011 | Richardson et al. |
| 2011/0252143 A1 | 10/2011 | Baumback et al. |
| 2011/0255445 A1 | 10/2011 | Johnson et al. |
| 2011/0258049 A1 | 10/2011 | Ramer et al. |
| 2011/0258614 A1 | 10/2011 | Tamm |
| 2011/0270964 A1 | 10/2011 | Huang et al. |
| 2011/0276623 A1 | 11/2011 | Girbal |
| 2011/0296053 A1 | 11/2011 | Medved et al. |
| 2011/0296370 A1 | 12/2011 | Ferris et al. |
| 2011/0296473 A1 | 12/2011 | Babic |
| 2011/0302304 A1 | 12/2011 | Baumback et al. |
| 2011/0307533 A1 | 12/2011 | Saeki |
| 2011/0320522 A1 | 12/2011 | Endres et al. |
| 2011/0320559 A1 | 12/2011 | Foti |
| 2012/0011190 A1 | 1/2012 | Driesen et al. |
| 2012/0014249 A1 | 1/2012 | Mao et al. |
| 2012/0023226 A1 | 1/2012 | Petersen et al. |
| 2012/0036238 A1 | 1/2012 | Sundaram et al. |
| 2012/0041899 A1 | 2/2012 | Greene et al. |
| 2012/0041970 A1 | 2/2012 | Ghosh et al. |
| 2012/0054860 A1 | 2/2012 | Wyschogrod et al. |
| 2012/0066360 A1 | 3/2012 | Ghosh |
| 2012/0072600 A1 | 3/2012 | Richardson et al. |
| 2012/0072608 A1 | 3/2012 | Peters et al. |
| 2012/0078998 A1 | 3/2012 | Son et al. |
| 2012/0079096 A1 | 3/2012 | Cowan et al. |
| 2012/0079115 A1 | 3/2012 | Richardson et al. |
| 2012/0089700 A1 | 3/2012 | Safruti et al. |
| 2012/0023090 A1 | 4/2012 | Holloway et al. |
| 2012/0089972 A1 | 4/2012 | Scheidel et al. |
| 2012/0096065 A1 | 4/2012 | Suit et al. |
| 2012/0096166 A1 | 4/2012 | Devarapalli et al. |
| 2012/0110515 A1 | 4/2012 | Abramoff et al. |
| 2012/0117621 A1 | 5/2012 | Kondamuru et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0142310 A1 | 5/2012 | Pugh et al. |
| 2012/0143688 A1 | 6/2012 | Alexander |
| 2012/0159476 A1 | 6/2012 | Ramteke et al. |
| 2012/0166516 A1 | 6/2012 | Simmons et al. |
| 2012/0169646 A1 | 6/2012 | Berkes et al. |
| 2012/0173760 A1 | 7/2012 | Jog et al. |
| 2012/0179796 A1 | 7/2012 | Nagaraj et al. |
| 2012/0179817 A1 | 7/2012 | Bade et al. |
| 2012/0179839 A1 | 7/2012 | Raciborski et al. |
| 2012/0198043 A1 | 7/2012 | Hesketh et al. |
| 2012/0198071 A1 | 8/2012 | Black et al. |
| 2012/0204176 A1 | 8/2012 | Tian et al. |
| 2012/0209942 A1 | 8/2012 | Zehavi et al. |
| 2012/0224516 A1 | 8/2012 | Stojanovski et al. |
| 2012/0226649 A1 | 9/2012 | Kovacs et al. |
| 2012/0233329 A1 | 9/2012 | Dickinson et al. |
| 2012/0233522 A1 | 9/2012 | Barton et al. |
| 2012/0233668 A1 | 9/2012 | Leafe et al. |
| 2012/0239725 A1 | 9/2012 | Hartrick et al. |
| 2012/0246129 A1 | 9/2012 | Rothschild et al. |
| 2012/0246257 A1 | 9/2012 | Brown |
| 2012/0254961 A1 | 9/2012 | Kim et al. |
| 2012/0257628 A1 | 10/2012 | Bu et al. |
| 2012/0259954 A1 | 10/2012 | McCarthy et al. |
| 2012/0272224 A1 | 10/2012 | Brackman |
| 2012/0278229 A1 | 10/2012 | Vishwanathan et al. |
| 2012/0278831 A1 | 11/2012 | van Coppenolle et al. |
| 2012/0278833 A1 | 11/2012 | Tam |
| 2012/0297009 A1 | 11/2012 | Amir et al. |
| 2012/0303785 A1 | 11/2012 | Sivasubramanian et al. |
| 2012/0303804 A1 | 11/2012 | Sundaram et al. |
| 2012/0311648 A1 | 11/2012 | Swildens et al. |
| 2012/0317573 A1 | 12/2012 | Osogami et al. |
| 2012/0324089 A1 | 12/2012 | Joshi |
| 2013/0003547 A1 | 1/2013 | Motwani et al. |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0018945 A1 | 1/2013 | Vendrow et al. |

(56) References Cited

U.S. PATENT DOCUMENTS

| | | |
|---|---|---|
| 2013/0019311 A1 | 1/2013 | Swildens et al. |
| 2013/0034099 A1 | 1/2013 | Hikichi et al. |
| 2013/0036307 A1 | 2/2013 | Gagliano et al. |
| 2013/0041872 A1 | 2/2013 | Aizman et al. |
| 2013/0042328 A1 | 2/2013 | Padinjareveetil |
| 2013/0046869 A1 | 2/2013 | Jenkins et al. |
| 2013/0046883 A1 | 2/2013 | Lientz et al. |
| 2013/0054675 A1 | 2/2013 | Jenkins et al. |
| 2013/0055374 A1 | 2/2013 | Kustarz et al. |
| 2013/0067530 A1 | 2/2013 | Spektor et al. |
| 2013/0061306 A1 | 3/2013 | Sinn |
| 2013/0073808 A1 | 3/2013 | Puthalath et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0080623 A1 | 3/2013 | Thireault |
| 2013/0080627 A1 | 3/2013 | Kukreja et al. |
| 2013/0080636 A1 | 3/2013 | Friedman et al. |
| 2013/0086001 A1 | 3/2013 | Bhogal et al. |
| 2013/0089005 A1 | 4/2013 | Li et al. |
| 2013/0111035 A1 | 4/2013 | Alapati et al. |
| 2013/0117282 A1 | 5/2013 | Mugali, Jr. et al. |
| 2013/0117849 A1 | 5/2013 | Golshan et al. |
| 2013/0130221 A1 | 5/2013 | Kortemeyer et al. |
| 2013/0133057 A1 | 5/2013 | Yoon et al. |
| 2013/0151646 A1 | 5/2013 | Chidambaram et al. |
| 2013/0191499 A1 | 7/2013 | Ludin et al. |
| 2013/0198341 A1 | 8/2013 | Kim |
| 2013/0212300 A1 | 8/2013 | Eggleston et al. |
| 2013/0219020 A1 | 8/2013 | McCarthy et al. |
| 2013/0227165 A1 | 8/2013 | Liu |
| 2013/0246567 A1 | 8/2013 | Green et al. |
| 2013/0254269 A1 | 9/2013 | Sivasubramanian et al. |
| 2013/0254879 A1 | 9/2013 | Chesla et al. |
| 2013/0263256 A1 | 9/2013 | Dickinson et al. |
| 2013/0268616 A1 | 10/2013 | Sakata et al. |
| 2013/0275549 A1 | 10/2013 | Field et al. |
| 2013/0279335 A1 | 10/2013 | Ahmadi |
| 2013/0283266 A1 | 10/2013 | Baset et al. |
| 2013/0305046 A1 | 10/2013 | Mankovski et al. |
| 2013/0305083 A1 | 11/2013 | Machida |
| 2013/0311583 A1 | 11/2013 | Humphreys et al. |
| 2013/0311605 A1 | 11/2013 | Richardson et al. |
| 2013/0311989 A1 | 11/2013 | Ota et al. |
| 2013/0339429 A1 | 11/2013 | Richardson et al. |
| 2013/0346465 A1 | 12/2013 | Maltz et al. |
| 2013/0346470 A1 | 12/2013 | Obstfeld et al. |
| 2013/0346567 A1 | 12/2013 | Richardson et al. |
| 2013/0346614 A1 | 12/2013 | Baughman et al. |
| 2014/0006465 A1 | 1/2014 | Davis et al. |
| 2014/0006577 A1 | 1/2014 | Joe et al. |
| 2014/0007239 A1 | 1/2014 | Sharpe et al. |
| 2014/0013403 A1 | 1/2014 | Shuster |
| 2014/0019605 A1 | 1/2014 | Boberg |
| 2014/0022951 A1 | 1/2014 | Lemieux |
| 2014/0036675 A1 | 1/2014 | Wang et al. |
| 2014/0040478 A1 | 2/2014 | Hsu et al. |
| 2014/0047104 A1 | 2/2014 | Rodriguez |
| 2014/0053022 A1 | 2/2014 | Forgette et al. |
| 2014/0059198 A1 | 2/2014 | Richardson et al. |
| 2014/0059208 A1 | 2/2014 | Yan et al. |
| 2014/0059379 A1 | 2/2014 | Ren et al. |
| 2014/0082165 A1 | 2/2014 | Marr et al. |
| 2014/0082614 A1 | 3/2014 | Klein et al. |
| 2014/0089917 A1 | 3/2014 | Attalla et al. |
| 2014/0108672 A1 | 3/2014 | Ou et al. |
| 2014/0108474 A1 | 4/2014 | David et al. |
| 2014/0122698 A1 | 4/2014 | Batrouni et al. |
| 2014/0119194 A1 | 5/2014 | Raciborski et al. |
| 2014/0122725 A1 | 5/2014 | Batrouni et al. |
| 2014/0137111 A1 | 5/2014 | Dees et al. |
| 2014/0143305 A1 | 5/2014 | Choi et al. |
| 2014/0149601 A1 | 5/2014 | Carney et al. |
| 2014/0164817 A1 | 5/2014 | Bartholomy et al. |
| 2014/0165061 A1 | 6/2014 | Greene et al. |
| 2014/0181268 A1 | 6/2014 | Stevens et al. |
| 2014/0195686 A1 | 6/2014 | Yeager et al. |
| 2014/0200036 A1 | 7/2014 | Egner et al. |
| 2014/0215019 A1 | 7/2014 | Ahrens |
| 2014/0244937 A1 | 8/2014 | Bloomstein et al. |
| 2014/0258523 A1 | 9/2014 | Kazerani et al. |
| 2014/0269371 A1 | 9/2014 | Badea et al. |
| 2014/0279852 A1 | 9/2014 | Chen |
| 2014/0280606 A1 | 9/2014 | Long |
| 2014/0280679 A1 | 9/2014 | Dey et al. |
| 2014/0297870 A1 | 9/2014 | Eggleston et al. |
| 2014/0297866 A1 | 10/2014 | Ennaji et al. |
| 2014/0298021 A1 | 10/2014 | Kwon et al. |
| 2014/0310402 A1 | 10/2014 | Giaretta et al. |
| 2014/0310811 A1 | 10/2014 | Hentunen |
| 2014/0325155 A1 | 10/2014 | Marshall et al. |
| 2014/0331328 A1 | 10/2014 | Wang et al. |
| 2014/0337472 A1 | 11/2014 | Newton et al. |
| 2014/0351413 A1 | 11/2014 | Smith et al. |
| 2014/0351871 A1 | 11/2014 | Bomfim et al. |
| 2015/0006615 A1 | 1/2015 | Wainner et al. |
| 2015/0019686 A1 | 1/2015 | Backholm |
| 2015/0026407 A1 | 1/2015 | Mclellan et al. |
| 2015/0067171 A1 | 1/2015 | Yum |
| 2015/0074228 A1 | 3/2015 | Drake |
| 2015/0081877 A1 | 3/2015 | Sethi et al. |
| 2015/0088586 A1 | 3/2015 | Pavlas et al. |
| 2015/0088964 A1 | 3/2015 | Shiell et al. |
| 2015/0088972 A1 | 3/2015 | Brand et al. |
| 2015/0089621 A1 | 3/2015 | Khalid |
| 2015/0095516 A1 | 3/2015 | Bergman |
| 2015/0106864 A1 | 4/2015 | Li et al. |
| 2015/0154051 A1 | 4/2015 | Kruglick |
| 2015/0156279 A1 | 6/2015 | Vaswani et al. |
| 2015/0188734 A1 | 6/2015 | Petrov |
| 2015/0189042 A1 | 7/2015 | Sun et al. |
| 2015/0195244 A1 | 7/2015 | Richardson et al. |
| 2015/0200991 A1 | 7/2015 | Kwon |
| 2015/0215388 A1 | 7/2015 | Kontothanassis et al. |
| 2015/0215656 A1 | 7/2015 | Pulung et al. |
| 2015/0242397 A1 | 8/2015 | Zhuang |
| 2015/0244580 A1 | 8/2015 | Saavedra |
| 2015/0256647 A1 | 8/2015 | Richardson et al. |
| 2015/0271031 A1 | 9/2015 | Beevers |
| 2015/0288647 A1 | 10/2015 | Chhabra et al. |
| 2015/0317118 A1 | 11/2015 | Orikasa et al. |
| 2015/0339136 A1 | 11/2015 | Suryanarayanan et al. |
| 2015/0341431 A1 | 11/2015 | Hartrick et al. |
| 2015/0358276 A1 | 11/2015 | Liu et al. |
| 2015/0358436 A1 | 12/2015 | Kim et al. |
| 2015/0363113 A1 | 12/2015 | Rahman et al. |
| 2015/0363282 A1 | 12/2015 | Rangasamy |
| 2016/0006672 A1 | 1/2016 | Saavedra |
| 2016/0021197 A1 | 1/2016 | Pogrebinsky et al. |
| 2016/0028598 A1 | 1/2016 | Khakpour et al. |
| 2016/0028755 A1 | 1/2016 | Vasseur et al. |
| 2016/0036857 A1 | 1/2016 | Foxhoven et al. |
| 2016/0065475 A1 | 2/2016 | Hilt et al. |
| 2016/0072669 A1 | 3/2016 | Saavedra |
| 2016/0072720 A1 | 3/2016 | Richardson et al. |
| 2016/0104346 A1 | 3/2016 | Ovalle et al. |
| 2016/0132600 A1 | 4/2016 | Woodhead et al. |
| 2016/0142251 A1 | 5/2016 | Contreras et al. |
| 2016/0182454 A1 | 5/2016 | Phonsa et al. |
| 2016/0182542 A1 | 6/2016 | Staniford |
| 2016/0241639 A1 | 6/2016 | Brookins et al. |
| 2016/0253262 A1 | 8/2016 | Nadgowda |
| 2016/0255042 A1 | 9/2016 | Newton |
| 2016/0269927 A1 | 9/2016 | Kim et al. |
| 2016/0274929 A1 | 9/2016 | King |
| 2016/0294678 A1 | 9/2016 | Khakpour et al. |
| 2016/0337426 A1 | 10/2016 | Shribman et al. |
| 2016/0366202 A1 | 11/2016 | Phillips et al. |
| 2016/0373789 A1 | 12/2016 | Tsukagoshi |
| 2017/0041428 A1 | 2/2017 | Katsev |
| 2017/0099345 A1 | 3/2017 | Leach |
| 2017/0099254 A1 | 4/2017 | Leach et al. |
| 2017/0109316 A1 | 4/2017 | Hack et al. |

(56) References Cited

U.S. PATENT DOCUMENTS

| | | | |
|---|---|---|---|
| 2017/0126796 | A1 | 4/2017 | Hollis et al. |
| 2017/0142062 | A1 | 5/2017 | Richardson et al. |
| 2017/0153980 | A1 | 6/2017 | Araújo et al. |
| 2017/0155678 | A1 | 6/2017 | Araújo et al. |
| 2017/0155732 | A1 | 6/2017 | Araújo et al. |
| 2017/0163425 | A1 | 6/2017 | Kaliski, Jr. |
| 2017/0170973 | A1 | 6/2017 | Gill et al. |
| 2017/0171146 | A1 | 6/2017 | Sharma et al. |
| 2017/0180217 | A1 | 6/2017 | Puchala et al. |
| 2017/0214761 | A1 | 6/2017 | Hsu et al. |
| 2017/0257340 | A1 | 7/2017 | Richardson et al. |
| 2017/0374121 | A1 | 12/2017 | Phillips et al. |
| 2018/0027040 | A1 | 1/2018 | Bae |
| 2018/0077109 | A1 | 1/2018 | Hoeme et al. |
| 2018/0063193 | A1 | 3/2018 | Chandrashekhar et al. |
| 2018/0077110 | A1 | 3/2018 | Huston, III et al. |
| 2018/0097631 | A1 | 3/2018 | Uppal et al. |
| 2018/0097634 | A1 | 4/2018 | Uppal et al. |
| 2018/0097831 | A1 | 4/2018 | Uppal et al. |
| 2018/0159757 | A1 | 4/2018 | Uppal et al. |
| 2018/0167444 | A1 | 6/2018 | Sivasubramanian et al. |
| 2018/0173526 | A1 | 6/2018 | Prinsloo et al. |
| 2018/0176615 | A1 | 6/2018 | Hannu et al. |
| 2018/0191817 | A1 | 6/2018 | Richardson et al. |
| 2018/0278717 | A1 | 7/2018 | Richardson et al. |
| 2018/0287916 | A1 | 9/2018 | Mizik et al. |
| 2018/0302322 | A1 | 10/2018 | Richardson et al. |
| 2018/0332107 | A1 | 10/2018 | Marr et al. |
| 2018/0337885 | A1 | 11/2018 | Singh et al. |
| 2018/0351904 | A1 | 11/2018 | Mizik et al. |
| 2018/0367498 | A1 | 12/2018 | Bliss et al. |
| 2019/0007515 | A1 | 1/2019 | Baldwin et al. |
| 2019/0020562 | A1 | 1/2019 | Richardson et al. |
| 2019/0028562 | A1 | 1/2019 | Watson et al. |
| 2019/0044787 | A1 | 1/2019 | Richardson et al. |
| 2019/0044846 | A1 | 2/2019 | Howard et al. |
| 2019/0073303 | A1 | 2/2019 | Marshall et al. |
| 2019/0089542 | A1 | 3/2019 | Richardson et al. |
| 2019/0089818 | A1 | 3/2019 | Choi |
| 2019/0098109 | A1 | 3/2019 | Watson |
| 2019/0121739 | A1 | 4/2019 | Richardson et al. |
| 2019/0129908 | A1 | 4/2019 | Kumarasamy |
| 2019/0140922 | A1 | 5/2019 | Ellsworth et al. |
| 2019/0173941 | A1 | 5/2019 | Puchala et al. |
| 2019/0173972 | A1 | 6/2019 | MacCarthaigh et al. |
| 2019/0190998 | A1 | 6/2019 | Sivasubramanian et al. |
| 2019/0222666 | A1 | 6/2019 | Uppal et al. |
| 2019/0268265 | A1 | 7/2019 | Richardson et al. |
| 2019/0297137 | A1 | 9/2019 | Richardson et al. |
| 2020/0065132 | A1 | 2/2020 | Mercier et al. |
| 2020/0084268 | A1 | 3/2020 | Hollis et al. |

FOREIGN PATENT DOCUMENTS

| | | | |
|---|---|---|---|
| CN | 1422468 | A | 6/2003 |
| CN | 1511399 | A | 7/2004 |
| CN | 1605182 | A | 4/2005 |
| CN | 101189598 | A | 5/2008 |
| CN | 101431539 | A | 5/2009 |
| CN | 101460907 | A | 6/2009 |
| CN | 101631133 | A | 1/2010 |
| CN | 103731481 | A | 4/2014 |
| EP | 1603307 | A2 | 12/2005 |
| EP | 1351141 | A2 | 10/2007 |
| EP | 2008167 | A2 | 12/2008 |
| EP | 3156911 | A1 | 4/2017 |
| JP | 07-141305 | | 6/1995 |
| JP | 2001-0506093 | | 5/2001 |
| JP | 2001-249907 | | 9/2001 |
| JP | 2002-024192 | | 1/2002 |
| JP | 2002-044137 | | 2/2002 |
| JP | 2002-323986 | | 11/2002 |
| JP | 2003-167810 | A | 6/2003 |
| JP | 2003-167813 | A | 6/2003 |
| JP | 2003-188901 | A | 7/2003 |
| JP | 2003-522358 | A | 7/2003 |
| JP | 2004-070935 | | 3/2004 |
| JP | 2004-532471 | | 10/2004 |
| JP | 2004-533738 | A | 11/2004 |
| JP | 2005-537687 | | 12/2005 |
| JP | 2007-133896 | A | 5/2007 |
| JP | 2007-207225 | A | 8/2007 |
| JP | 2008-515106 | A | 5/2008 |
| JP | 2009-071538 | A | 4/2009 |
| JP | 2012-509623 | | 4/2012 |
| JP | 2012-209623 | | 10/2012 |
| WO | WO 2001/045349 | A2 | 6/2001 |
| WO | WO 2002/069608 | A2 | 9/2002 |
| WO | WO 2005/071560 | A1 | 8/2005 |
| WO | WO 2007/007960 | A1 | 1/2007 |
| WO | WO 2007/126837 | A2 | 11/2007 |
| WO | WO 2009124006 | A2 | 10/2009 |
| WO | WO 2010/002603 | A1 | 1/2010 |
| WO | WO 2012/044587 | | 4/2012 |
| WO | WO 2012065641 | A1 | 5/2012 |
| WO | WO 2014/047073 | A1 | 3/2014 |
| WO | WO 2017/106455 | A1 | 6/2017 |

OTHER PUBLICATIONS

Extended European Search Report in Application No. 16876655.8 dated Aug. 20, 2019.
Office Action in Indian Application No. 2823/DELNP/2015 dated Oct. 25, 2019.
"Non-Final Office Action dated Jan. 3, 2012," U.S. Appl. No. 12/652,541; dated Jan. 3, 2012; 35 pages.
"Final Office Action dated Sep. 5, 2012," U.S. Appl. No. 12/652,541; dated Sep. 5, 2012; 40 pages.
"Notice of Allowance dated Jan. 4, 2013," U.S. Appl. No. 12/652,541; dated Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdeliverynetwork&oldid=601009970, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

(56) References Cited

OTHER PUBLICATIONS

"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Arends et al., DNS Security Introduction and Requirements, RFC 4033, Mar. 2005, 21 pages.
Ariyapperuma et al., "Security Vulnerabilities in DNS and DNSSEC." The Second International Conference on Availability, Reliability and Security, IEEE, 2007, 8 pages.
Armour et al.: "A Heuristic Algorithm and Simulation Approach to Relative Location of Facilities"; Management Science, vol. 9, No. 2 (Jan. 1963); pp. 294-309.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls," ;login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chandramouli et al., "Challenges in Securing the Domain Name System." IEEE Security & Privacy4.1 (2006),pp. 84-87.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Cohen et al., "Proactive Caching of DNS Records: Addressing a Performance Bottleneck", Proceedings of Saint 2001 Symposium on Applications and the Internet; 8-12, Jan. 8, 2001, IEEE Computer Society, pp. 85-94.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Eastlake, Donald, Domain Name System Security Extensions, RFC 2535, Mar. 1999, 47 pages.
Frangoudis et al., "PTPv2-based network load estimation and its application to QoE monitoring for Over-the-Top services", IEEE, The 5th International conference on Information, Intelligence, Systems and Applications, IISA 2014, XP032629858, Jul. 7, 2014, pp. 176-181.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, In Proc. of Networking 2005, all pages.
Gunther et al, "Measuring Round Trip Times to determine the Distance between WLAN Nodes", Dec. 18, 2004, Technical University Berlin, all pages.
Guo, F., Understanding Memory Resource Management in Vmware vSphere 5.0, Vmware, 2011, pp. 1-29.
Hameed, CC, "Disk Fragmentation and System Performance", Mar. 14, 2008, 3 pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, Mar. 26-30, 2007.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
JH Software, Moving a DNS Server to a New IP Address, last updated Jan. 26, 2006, 1 page.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Kenshi, P., "Help File Library: Iptables Basics," Justlinux, retrieved Dec. 1, 2005, from http://www.justlinux.com/nhf/Security/Iptables _ Basics.html, 4 pages.
Krsul et al., "VMPlants: Providing and Managing Virtual Machine Execution Environments for Grid Computing", Nov. 6, 2004 (Nov. 6, 2004), Supercomputing, 2004. Proceedings of the ACM/IEEE SC2004 Conference Pittsburgh, PA, USA Nov. 6-12, 2004, Piscataway, NJ, USA, IEEE, 1730 Massachusetts Ave., NW Washington, DC 20036-1992 USA, 12 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03

(56) References Cited

OTHER PUBLICATIONS

Proceedings of the 3rd ACM workshop on Digital rights management; 2003; pp. 77-89; ACM Digital Library.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Sharif et al, "Secure In-VM Monitoring Using Hardware Virtualization", Microsoft, Oct. 2009 http://research.microsoft.com/pubs/153179/sim-cc509.pdf; 11 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on The Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment, " Report of Study of Information Processing Society of Japan, Information Processing Society, vol. 2006, No. 20, pp. 127-132, Japan, Feb. 28, 2006.
Zhao et al., "Distributed file system support for virtual machines in grid computing", Jun. 4, 2004 (Jun. 4, 2004), High Performance Distributed Computing, 2004. Proceedings. 13th IEEE International Symposium on Honolulu, HI, USA Jun. 4-6, 2004, Piscataway, NJ, USA, IEEE, p. 202-211.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
Office Action in Application No. 09729072.0 dated May 14, 2018.
Office Action in Application No. 09729072.0 dated Dec. 7, 2018.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, dated Oct. 12, 2011 in 11 pages.
Supplementary European Search Report in Application No. 09727694.3 dated Jan. 30, 2012 in 6 pages.
Singapore Examination Report in Application No. 201006837-7 dated Mar. 16, 2012.
First Office Action in Chinese Application No. 200980111426.1 dated Feb. 16, 2013.
Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
Fifth Office Action in Chinese Application No. 200980111426.1 dated Aug. 14, 2015.
First Office Action in Japanese Application No. 2011-502139 dated Nov. 5, 2013.
Decision of Rejection in Application No. 2011-502139 dated Jun. 30, 2014.
Office Action in Japanese Application No. 2011-502139 dated Aug. 17, 2015.
Office Action in Indian Application No. 5937/CHENP/2010 dated Jan. 19, 2018.
Singapore Written Opinion in Application No. 201006874-0, dated Oct. 12, 2011 in 10 pages.
First Office Action in Japanese Application No. 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report in European Application No. 09839809.2 dated May 11, 2015.
Office Action in European Application No. 09839809.2 dated Dec. 8, 2016.
Office Action in Indian Application No. 6210/CHENP/2010 dated Mar. 27, 2018.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
Supplementary European Search Report in Application No. 09728756.9 dated Jan. 8, 2013.
First Office Action in Japanese Application No. 2011-503091 dated Nov. 18, 2013.
Office Action in Japanese Application No. 2014-225580 dated Oct. 26, 2015.
Office Action in Japanese Application No. 2014-225580 dated Oct. 3, 2016.
Search Report and Written Opinion issued in Singapore Application No. 201006873-2 dated Oct. 12, 2011.
Examination Report in Indian Application No. 6213/CHENP/2010 dated May 23, 2018.
First Office Action is Chinese Application No. 200980125551.8 dated Jul. 4, 2012.
First Office Action in Japanese Application No. 2011-516466 dated Mar. 6, 2013.
Second Office Action in Japanese Application No. 2011-516466 dated Mar. 17, 2014.
Decision of Refusal in Japanese Application No. 2011-516466 dated Jan. 16, 2015.
Office Action in Japanese Application No. 2011-516466 dated May 30, 2016.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.

(56) References Cited

OTHER PUBLICATIONS

First Office Action in Canadian Application No. 2741895 dated Feb. 25, 2013.
Second Office Action in Canadian Application No. 2741895 dated Oct. 21, 2013.
Partial Supplementary Search Report in European Application No. 09826977.2 dated Oct. 4, 2016.
Search Report and Written Opinion in Singapore Application No. 201103333-9 dated Nov. 19, 2012.
Examination Report in Singapore Application No. 201103333-9 dated Aug. 13, 2013.
Office Action in Chinese Application No. 201310717573.1 dated Jul. 29, 2016.
Office Action in European Application No. 11767118.0 dated Feb. 3, 2017.
Office Action in European Application No. 11767118.0 dated Jul. 25, 2018.
Office Action in European Application No. 11767118.0 dated Jan. 29, 2019.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Second Office Action in Chinese Application No. 201180046104.0 dated Sep. 29, 2015.
Third Office Action in Chinese Application No. 201180046104.0 dated Apr. 14, 2016.
Decision of Rejection in Chinese Application No. 201180046104.0 dated Oct. 17, 2016.
Examination Report in Singapore Application No. 201301573-0 dated Dec. 22, 2014.
Examination Report in Indian Application No. 3105/DELNP/2013, dated Feb. 19, 2019.
International Preliminary Report on Patentability in PCT/US2011/061486 dated May 22, 2013.
International Search Report and Written Opinion in PCT/US2011/061486 dated Mar. 30, 2012 in 11 pages.
Office Action in Canadian Application No. 2816612 dated Nov. 3, 2015.
Office Action in Canadian Application No. 2816612 dated Oct. 7, 2016.
Office Action in Canadian Application No. 2816612 dated Aug. 8, 2017.
First Office Action in Chinese Application No. 201180053405.6 dated Feb. 10, 2015.
Second Office Action in Chinese Application No. 201180053405.6 dated Dec. 4, 2015.
Office Action in Japanese Application No. 2013-540982 dated Jun. 2, 2014.
Written Opinion in Singapore Application No. 201303521-7 dated May 20, 2014.

Extended Search Report in European Application No. 18156163 dated Sep. 3, 2018.
Examination Report in Indian Application No. 4487/DELNP/2013 dated Dec. 28, 2018.
Office Action in Japanese Application No. 2015-533132 dated Apr. 25, 2016.
Office Action in Canadian Application No. 2884796 dated Apr. 28, 2016.
Office Action in Russian Application No. 2015114568 dated May 16, 2016.
Supplementary Examination Report in Singapore Application No. 11201501987U dated May 17, 2017.
Office Action in Chinese Application No. 2013800492635 dated Aug. 30, 2017.
Office Action in European Application No. 13770602.4 dated Mar. 11, 2019.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.
Office Action in Chinese Application No. 200780020255.2 dated Mar. 4, 2013.
Office Action in Chinese Application No. 201310537815.9 dated Feb. 1, 2018.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 4 pages.
Office Action in Japanese Application No. 2015-075644 dated Apr. 5, 2016.
Office Action in European Application No. 07754164.7 dated Dec. 14, 2015.
Office Action in European Application No. 07754164.7 dated Jan. 25, 2018.
Office Action in Chinese Application No. 201310537815.9 dated Jul. 5, 2016.
Office Action in Chinese Application No. 201310537815.9 dated Jun. 2, 2017.
International Search Report and Written Opinion in PCT/US/2016/066848 dated May 1, 2017.
International Preliminary Report on Patentability in PCT/US/2016/066848 dated Jun. 19, 2018.
Partial Search Report in European Application No. 16876655.8 dated May 15, 2019.
International Search Report and Written Opinion in PCT/US2017/055156 dated Dec. 13, 2017.
International Preliminary Report on Patentability and Written Opinion in PCT/US2017/055156 dated Apr. 9, 2019.
International Search Report and Written Opinion in PCT/US2018/036634 dated Sep. 11, 2018.
Extended Search Report in European Applicaton No. 19184826.6 dated Jan. 17, 2020.
International Preliminary Report on Patentability and Written Opinion in PCT/US2018/036634 dated Dec. 24, 2019.

\* cited by examiner

MANAGING RESOURCES USING RESOURCE EXPIRATION DATA

This application is a continuation of U.S. patent application Ser. No. 16/179,473, now U.S. Pat. No. 10,521,348 entitled "MANAGING RESOURCES USING RESOURCE EXPIRATION DATA" and filed Nov. 2, 2018, which in turn is a continuation of U.S. patent application Ser. No. 14/871,872, now U.S. Pat. No. 10,162,753, entitled "MANAGING RESOURCES USING RESOURCE EXPIRATION DATA" and filed on Sep. 30, 2015, which in turn is a continuation of U.S. patent application Ser. No. 14/331,067, now U.S. Pat. No. 9,176,894, entitled "MANAGING RESOURCES USING RESOURCE EXPIRATION DATA" and filed on Jul. 14, 2014, which in turn is a continuation of U.S. patent application Ser. No. 12/485,783, now U.S. Pat. No. 8,782,236, entitled "MANAGING RESOURCES USING RESOURCE EXPIRATION DATA" and filed on Jun. 16, 2009, the disclosures of which are incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices.

With reference to previous illustrative example, the content provider can leverage a CDN service provider with the modification or substitution of resource identifiers associated with the embedded resources. Specifically, the resource identifiers can reference a computing device associated with the CDN service provider such that the client computing device would transmit the request for the additional resources to the referenced CDN service provider computing device. Typically, the content provider facilitates the utilization of a CDN provider by including CDN-provider specific resources identifiers in requested content (e.g., Web pages). This approach generally corresponds to an "offline" process implemented by the content provider in advance of receipt of a request for the original content from the client computing devices. Accordingly, modifications to resource identifiers, such as to provide alternative resources identifiers for the same CDN service provider, to provide additional information utilized by CDN service providers in processing the request for content and/or to identify alternative CDN service providers, can become inefficient as they typically require implementation of the offline process the content provider.

As with content providers, CDN providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
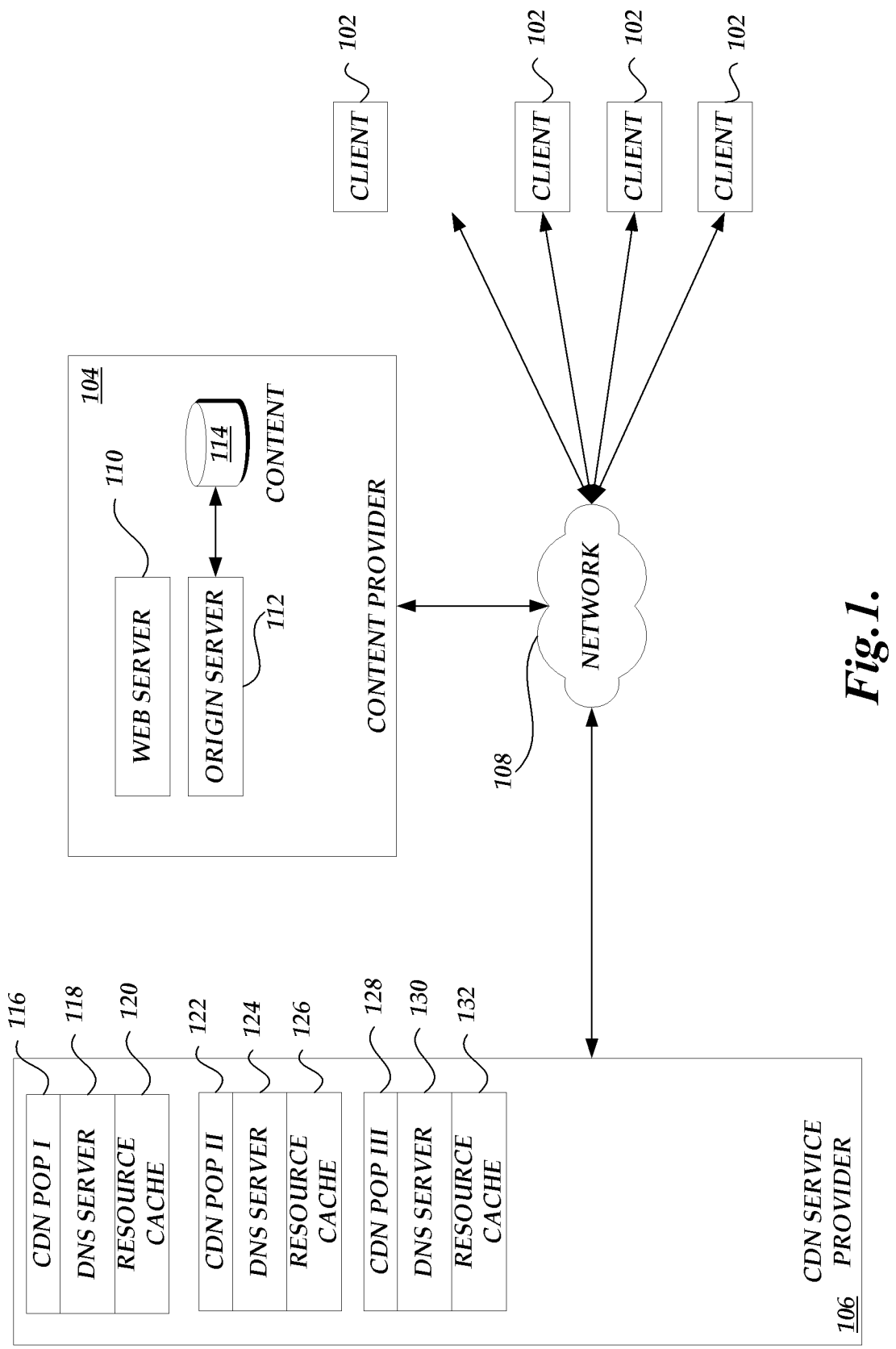
FIG. 1 is a block diagram illustrative of content delivery environment including a number of client computing devices, content provider, a content delivery network service provider, and a network computing and storage provider.

Generally described, the present disclosure is directed to content management techniques for responding to resource requests from a client computing device to a network computing component via a content delivery network ("CDN"). Specifically, aspects of the disclosure will be described with regard to management of resources within a resource cache component hierarchy. The management of the objects can be implemented in a manner such that the most frequently requested content (e.g., most popular resources) is available for delivery by the most accessible portions of the resource cache component hierarchy. Additionally, less frequently requested content can be distributed within the resource cache component hierarchy to less accessible portions of the resource cache component hierarchy. Although various aspects of the disclosure will be described with regard to illustrative examples and embodiments, one skilled in the art will appreciate that the disclosed embodiments and examples should not be construed as limiting.

A service provider, such as a CDN service provider, can maintain a hierarchy of cache server components to provide cached resources. In certain embodiments, a service provider can manage resource expiration data associated with the resources maintained in the resource cache component hierarchy as indicative of the popularity, or relative popularity, of the resource. In the discussion below, embodiments are discussed with respect to expiration data that can be described as a time to live, after which the cache server component deletes the resource, designates the resource as stale or allows the storage location corresponding to the expired resource to be overwritten. Accordingly, the expiration data may be specified in terms of a measured unit of time. However, one skilled in the relevant art will appreciate that the expiration data may be specified in terms of other measurable activities, such as frequency of requests, and the like.

Traditionally, cache server components within a cache server hierarchy associate resource expiration data such that the most recently requested resource is associated with the highest expiration data (e.g., the most recently requested resource is associated with the longest time to live). In this embodiment, however, the cache server components within the resource cache component hierarchy assign expiration data, such as a resident time, to resources based upon the position of the respective cache server component within the resource cache component hierarchy and the relative frequency in which the resource has been requested. Specifically, in one example, resources are assigned shorter expiration data for the cache servers at the lowest levels of the resource cache component hierarchy that are typically the primary cache components fielding resource requests. The lowest level of the resource cache component hierarchy is often referred to as the "edge" of the resource cache component hierarchy. Additionally, resources are assigned longer expiration data in successively higher levels of the resource cache component hierarchy. Additionally, the expiration data for a given resource may be modified by a cache server component when a request for that resource is received by that cache server component such that content will reside within the various cache server components according to the frequency in which the content is requested by client computing devices.

For less popular resources, the resource will migrate through the cache server components of a resource cache component hierarchy as the expiration data expires unless subsequent requests for the resources are received. In one example, a newly obtained resource is cached through several components of a resource cache component hierarchy after the processing of the initial request for the resource. At each level of the resource cache component hierarchy, the resource is associated with shorter expiration data, such that the shortest expiration data with be assigned at the edge of a resource cache component hierarchy. If the requested resource is not requested, the version of the resource stored at each level of the hierarchy will successively expire. Thus, the expiration of the version of the resource has the effect of "pushing" the resource up the resource cache component hierarchy, in which the version of the resource is associated with longer expiration data. Subsequent requests for the resource at the edge servers may then cause the edge servers to request the resource from the cache server components higher in the resource cache component hierarchy. In another example, if the cache server components receive requests for the resource prior to the expiration of the expiration data, the expiration data is reset and the resource is maintained at the cache server component and the expiration data does not need to be modified. Thus, more popular content may be maintained at the edge cache servers, as their expiration data may be frequently reset.

FIG. 1 is a block diagram illustrative of a content delivery environment 100 for the management and processing of content requests. As illustrated in FIG. 1, the content delivery environment 100 includes a number of client computing devices 102 (generally referred to as clients) for requesting content from a content provider and/or a CDN service provider. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS name server, that generates the DNS queries attributed to the client computing device. In one embodiment, the local DNS resolver component may be provided by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider.

One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider (e.g., return an IP address responsive to the DNS query). A DNS name server component is considered to be authoritative to a DNS query if the DNS name server can completely resolve the query by providing a responsive IP address. Additionally, the content provider 104 may omit some of the components illustrated in FIG. 1, such as the origin server 112.

With continued reference to FIG. 1, the content delivery environment 100 can further include a CDN service provider 106 in communication with the one or more client computing devices 102 and the content provider 104 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102.

Each CDN POP 116, 122, 128 also includes a resource cache component 120, 126, 132 made up of a number of cache server computing devices for storing resources from content providers and transmitting various requested resources to various client computers. The DNS components 118, 124 and 130 and the resource cache components 120, 126, 132 may further include additional software and/or hardware components that facilitate communications including, but not limited to, load balancing or load sharing software/hardware components.

As discussed in detail with respect to FIGS. 6A-6B below, the resource cache components may be logically organized in a hierarchy, where resource cache components located close to client computing devices (e.g., edge cache components) populate the lower levels of the resource cache component hierarchy and resource cache components located further from the client computing devices populate the higher levels of the resource cache component hierarchy. Still further, the resource cache components 120, 126, 132 may include hardware and/or software components for tracking the expiration of resources stored on behalf of one or more various content providers 104. In an embodiment, the expiration tracking components may assign an expiration time (e.g., time to live) to at least a portion of the resources stored within their respective resource cache component and provided to other resource cache components with the cache server hierarchy. In another embodiment, the expiration tracking components can monitor a residence time during which resources are stored by their resource cache component. The expiration time and residence time may be employed by the resource cache components 120, 126, 132 for expiring stored resources.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like. Still further, although the resource cache components 120, 126, 132 are discussed as being associated with the CDN service provider 106, one skilled in the relevant art will appreciate that the resource cache components 120, 126, 132 may be provided different service providers, independently or on behalf content provider 104 or CDN server provider 106.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
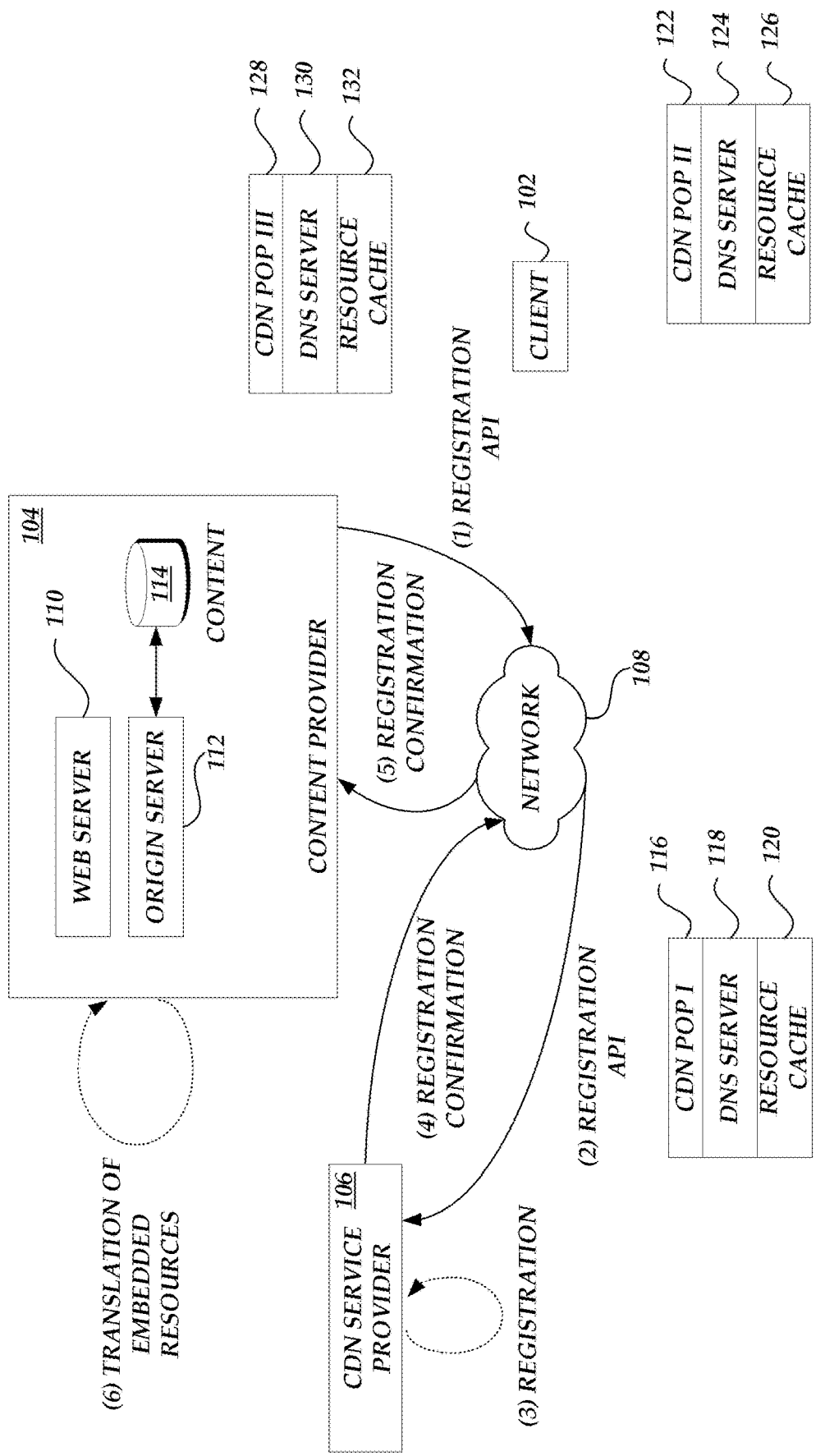
FIG. 2 is a block diagram of the content delivery environment of FIG. 1 illustrating the registration of a content provider with a content delivery network service provider.

With reference to FIG. 2, an illustrative interaction for registration of a content provider 104 with the CDN service provider 106 will be described. As illustrated in FIG. 2, the CDN content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106. Additionally, the registration API can further facilitate the specification of content provider service levels, financial cost criteria, or other content provider specified criteria that can be utilized by the CDN service provider 106 in request routing processing.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a CDN POP 116, 122, 128 associated with the CDN service provider 106. In the event that the resource cache component 120, 126, 132 of a selected CDN POP does not have a copy of a resource requested by a client computing device 102, owing to the expiration of the resource from the resource cache component 120, 126, 132 of the selected CDN POP in accordance with the expiration data assigned to the resource, the resource cache component 120, 126, 132 will request the resource. Such a resource request may be directed to one or more hierarchically superior resource cache components or, if the resource is also absent from these hierarchically superior resource cache components, the origin server 112 previously registered by the content provider 104.

With continued reference to FIG. 2, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, client identifiers, such as client identification codes, content provider identifiers, such as content provider identification codes, executable code for processing resource identifiers, such as script-based instructions, the like. In another embodiment, in addition or alternatively, the additional information can include file type identifiers which can include file type information. Additional information may also include or be associated with requirements for selecting a POP for processing the requested content, such as quality of service criteria which can include information as to compression rates, processing power, processing speed, and/or bandwidth of the POP, and the like. One skilled in the relevant art will appreciate that various types of additional information may be generated by the CDN service provider 106 and that the additional information may be embodied in any one of a variety of formats.

The CDN service provider 106 returns an identification of applicable domains for the CDN service provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 112 to a domain corresponding to the CDN service provider. The translated URLs are embedded into requested content in a manner such that DNS queries for the translated URLs will resolve to a DNS server corresponding to the CDN service provider 106 and not a DNS server corresponding to the content provider 104.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), generally referred to as a DNS portion of the URL, a name of the resource to be requested (e.g., "resource.jpg") and a path where the resource will be found (e.g., "path"), the path and resource generally referred to as a path portion of the URL. In this illustrative example, the content provider URL has the form of:

http://www.contentprovider.com/path/resource.jpg

During an illustrative translation process, the content provider URL is modified such that requests for the resources associated with the translated URLs resolve to a CDN POP associated with the CDN service provider 106. In one embodiment, the translated URL identifies the domain of the CDN service provider 106 (e.g., "cdnprovider.com"), the same name of the resource to be requested (e.g., "resource.xxx") and the same path where the resource will be found (e.g., "path"). One skilled in the relevant art will appreciate that the name information and the path information is not accessible to a DNS name server as a part of DNS query processing. Accordingly, the portion of the URL including the domain and any preceding information is generally referred to as the "DNS portion" of the URL.

Additionally, the translated URL can include additional processing information (e.g., "additional information") in the DNS portion of the URL. The additional information can correspond to any one of a variety of information utilized by the CDN service provider 106 to process a corresponding DNS query. The translated URL would have the form of:

http://additional_information.cdnprovider.com/path/resource.xxx

Figure 3:
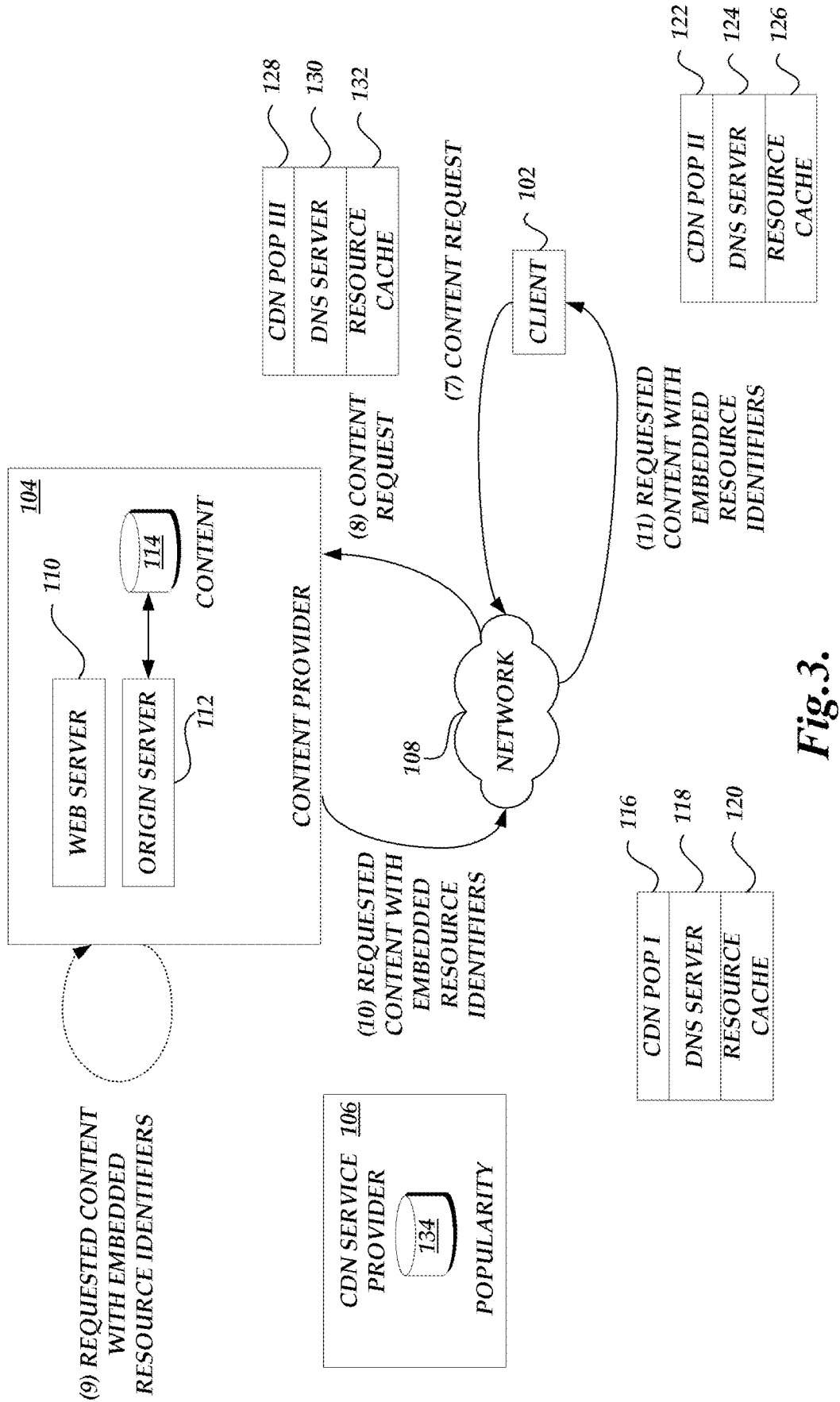
FIG. 3 is a block diagram of the content delivery environment of FIG. 1 illustrating the generation and processing of a content request from a client computing device to a content provider.

In another embodiment, the information associated with the CDN service provider 106 is included in a modified URL, such as through prepending or other techniques, such that the translated URL can maintain all of the information associated with the original URL. In this embodiment, the translated URL would have the form of:

http://additional_information.cdnprovider.com/www.contentprovider.com/path/resource.xxx With reference now to FIG. 3, after completion of the registration and translation processes illustrated in FIG. 2, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers can be generally referred to as original resource identifiers or original URLs.

Upon receipt of the requested content, the client computing device 102, such as through a browser software application, begins processing any of the markup code included in the content and attempts to acquire the resources identified by the embedded resource identifiers. Accordingly, the first step in acquiring the content corresponds to the issuance, by the client computing device 102 (through its local DNS resolver), of a DNS query for the original URL resource identifier that results in the identification of a DNS server authoritative to the "." and the "com" portions of the translated URL. After resolving the "." and "corn" portions of the embedded URL, the client computing device 102 then issues a DNS query for the resource URL that results in the identification of a DNS server authoritative to the ".cdnprovider" portion of the embedded URL. The issuance of DNS queries corresponding to the "." and the "com" portions of a URL are well known and have not been illustrated.

Figure 4:
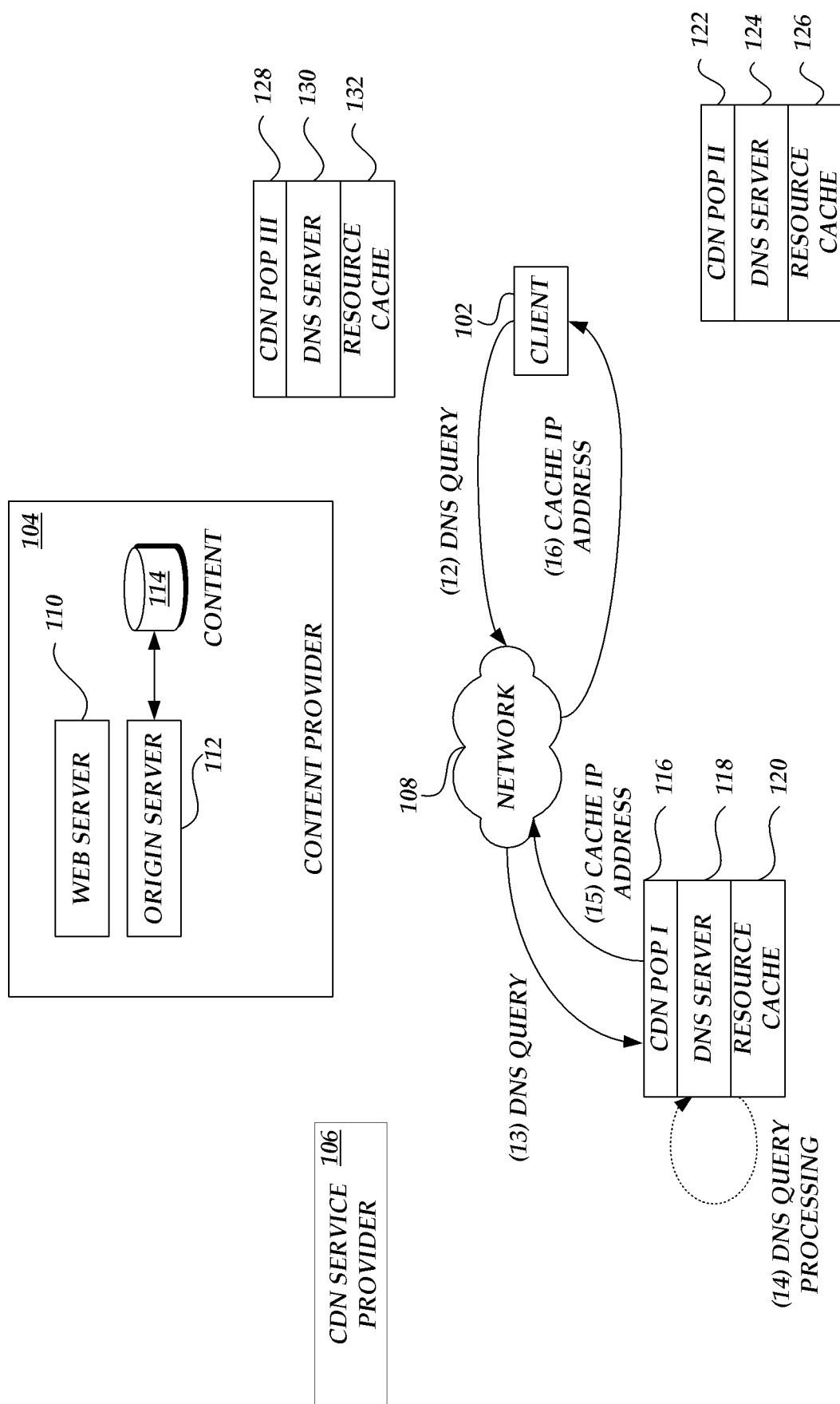
FIG. 4 is a block diagram of the content delivery environment of FIG. 1 illustrating one embodiment of the generation and processing of a DNS query corresponding to an embedded resource from a client computing device to a content delivery network service provider.

With reference now to FIG. 4, in an illustrative embodiment, the successful resolution of the "cdnprovider" portion of the original URL identifies a network address, such as an IP address, of a DNS server associated with the CDN service provider 106. In one embodiment, the IP address can be a specific network address unique to a DNS server component of a POP. In another embodiment, the IP address can be shared by one or more CDN POPs. In this embodiment, a further DNS query to the shared IP address utilizes a one-to-many network routing schema, such as anycast, such that a specific POP will receive the request as a function of network topology. For example, in an anycast implementation, a DNS query issued by a client computing device 102 to a shared IP address will arrive at a DNS server component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP. It will be appreciated by one skilled in the relevant art that a number of ways exist to determine network topology distance.

With continued reference to FIG. 4, in either of the above identified embodiments (or any other embodiment), a specific DNS server in the DNS component 118 of a CDN POP 116 receives the DNS query corresponding to the original URL from the client computing device 102. Once one of the DNS servers in the DNS component 118 receives the request, the specific DNS server attempts to resolve the request. In one illustrative embodiment as shown in FIG. 4, a specific DNS server resolves the DNS query by identifying an IP address of a cache server component that will process the request for the requested resource. As will be described further below in reference to FIG. 6, a selected resource cache component can process the request by either providing the requested resource if it is available or attempting to obtain the requested resource from another source, such as a peer cache server computing device, a hierarchically superior cache server computing device, or the origin server 112 of the content provider 104.

The CDN service provider 106 can utilize the additional information (e.g., the "additional information") included in the modified URL to select a more appropriate POP. In one aspect, the CDN service provider 106 can utilize the additional information to select from a set of DNS name servers identified as satisfying routing criteria including, but are not limited to, financial cost to content provider 104, network performance (e.g., "internet weather") service level criteria, content provider specified, etc.

In one example, the CDN service provider 106 can attempt to direct a DNS query to DNS servers according to geographic criteria. The geographic criteria can correspond to a geographic-based regional service plan contracted between the CDN service-provider 106 and the content provider 104 in which various CDN service provider 106 POPs are grouped into geographic regions. Accordingly, a client computing device 102 DNS query received in a region not corresponding to the content provider's regional plan may be better processed by a DNS name server in region corresponding to the content provider's regional plan. In this example, the DNS component 118 may also obtain geographic information from the client directly (such as information provided by the client computing device or ISP) or indirectly (such as inferred through a client computing device's IP address).

In still a further example, the CDN service provider 106 can attempt to direct a DNS query to DNS servers according to network performance criteria. The network performance criteria can correspond to measurements of network performance for transmitting data from the CDN service provider POPs to the client computing device 102. Examples of network performance metrics can include network data transfer latencies measured by the client computing device or the CDN service provider 106, network data error rates, and the like.

In an illustrative embodiment, the specific DNS server can utilize a variety of information in selecting a resource cache component. In one illustrative embodiment, the DNS server can use the additional information in the DNS portion of the resource identifier (which is used to resolve the DNS query by the DNS server) to return an IP address of a resource cache component. In another example, the DNS name server component can default to a selection of a resource cache component of the same POP. In another example, the DNS name server components can select a resource cache component based on various load balancing or load sharing algorithms. Still further, the DNS name server components can utilize network performance metrics or measurements to assign specific resource cache components. The IP address selected by a DNS name server component may correspond to a specific caching server in the resource cache. Alternatively, the IP address can correspond to a hardware/software selection component (such as a load balancer).

Even further, the DNS server can also use information obtained directly from a client computing device (such as information provided by the client computing device or ISP) or indirectly (such as inferred through a client computing device's IP address) to select a resource cache component. Such client computing device information can, for example, be geographic information. Still further, the DNS server components can utilize network performance metrics or measurements, as discussed above, to assign specific resource cache components.

Figure 5:
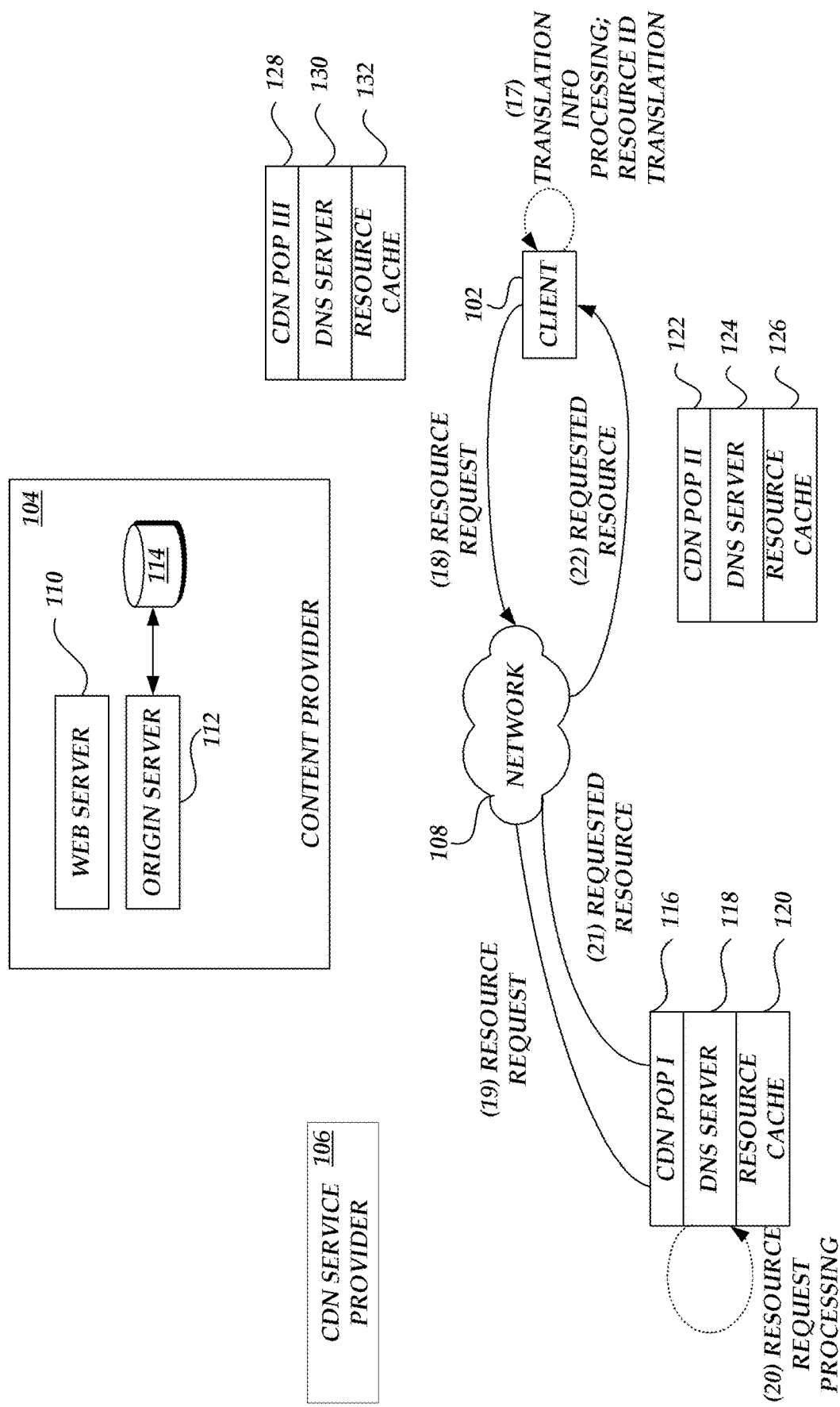
FIG. 5 is a block diagram of the content delivery environment of FIG. 1 illustrating the generation and processing of embedded resource requests from a client computing device to a content delivery network service provider.

With reference now to FIG. 5, in an illustrative example, assume that the DNS component 118 has resolved the received DNS query by returning the IP address of the resource cache component 120 of POP 116. Upon receipt of the IP address for the resource cache component 120, the client computing device 102 transmits requests for the requested content to the resource cache component 120.

Figure 6A:
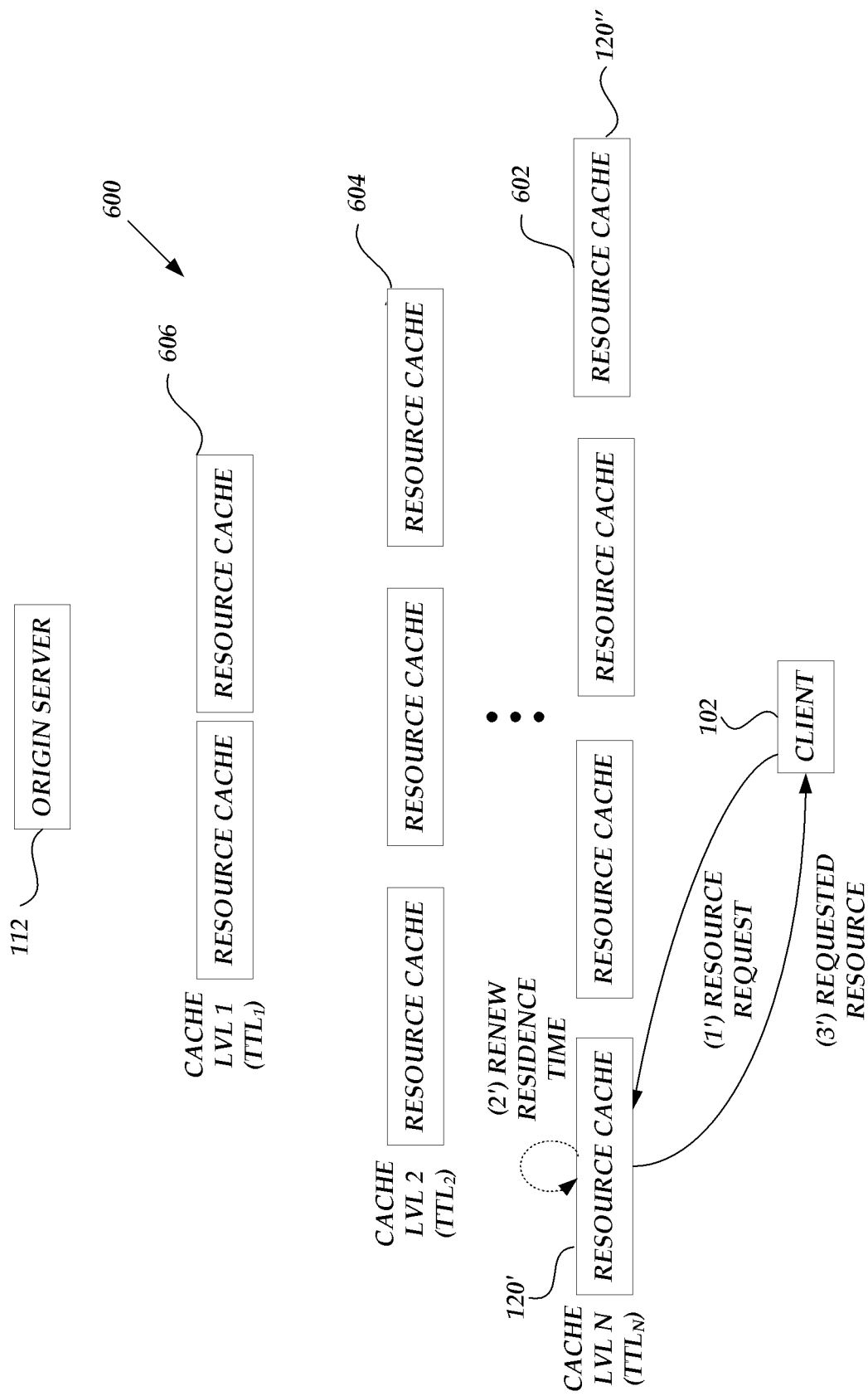
FIGS. 6A-6B are block diagrams of a hierarchy of cache server components illustrative of the processing of content requests.
Figure 6B:
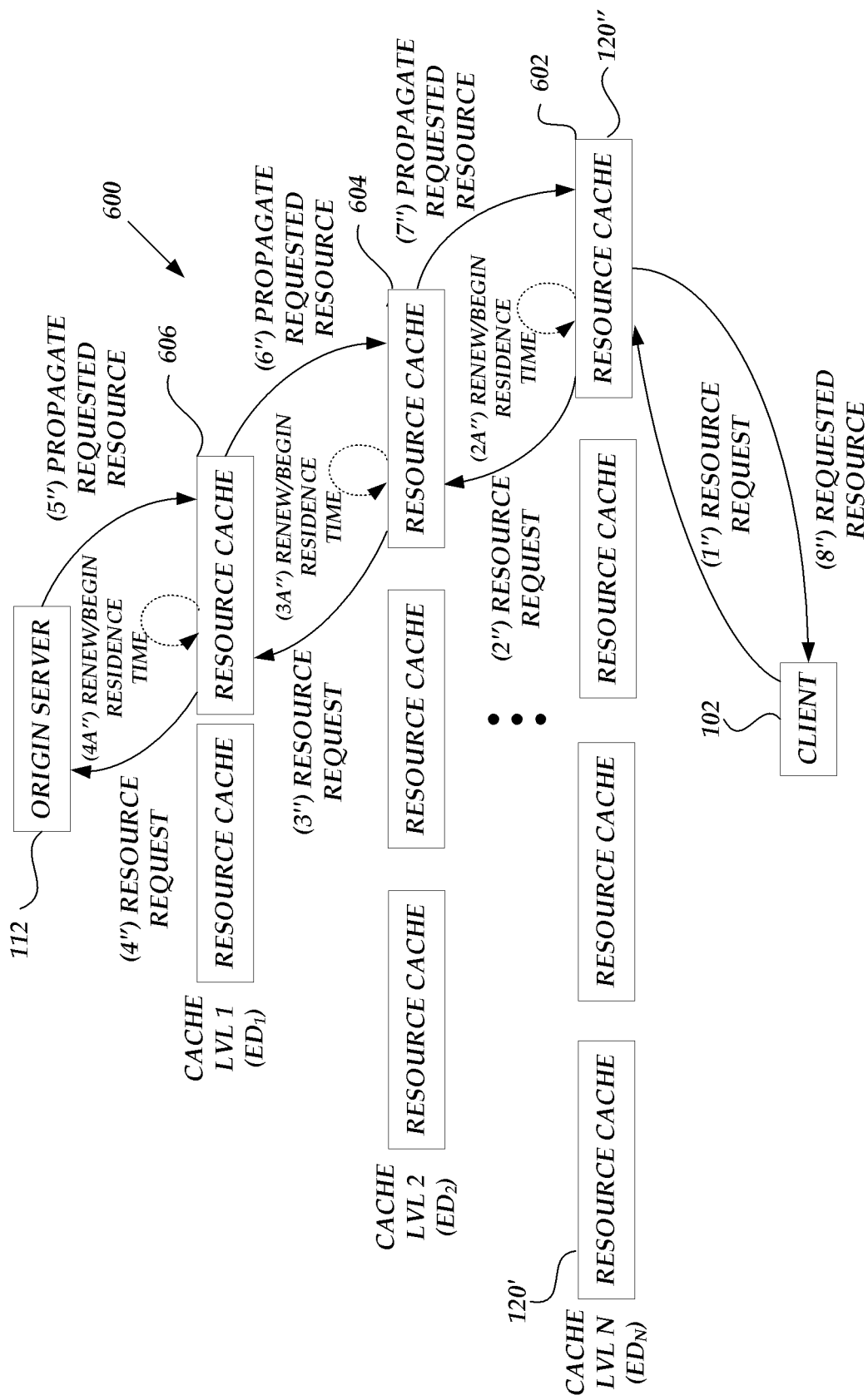

With reference to FIGS. 6A-6B, the resource cache component 120 processes the request and the requested resource is transmitted to the client computing device 102. FIG. 6 illustrates one embodiment of a hierarchy of cache server components 600, including resource cache component 120 of POP 116 selected to respond to the DNS query from the client computing device 102. For clarity in discussing various embodiments, the resource cache component 120 will be referred to as cache component 120' and 120".

The resource cache component hierarchy 600 illustrated in FIGS. 6A-6B comprises a plurality of resource cache components that are logically organized in levels. Resource cache components residing on the same logical level as the resource cache component of interest (e.g., cache server component 120) are referred to as peers, while resource cache components residing at a higher logical level as the resource cache component of interest are referred to as hierarchically superior or parent cache components. At the top of the hierarchy is the origin server 112 of the content provider, as any resource to be maintained by one or more resource cache components of the resource cache component hierarchy may ultimately retrieved from the origin server 112, in the event that the resource is not maintained by a peer or parent resource cache component.

Each resource cache component includes tracking components, which may include hardware and/or software components for management of stored resources according to expiration data. In an embodiment, the tracking components may allow the resource cache component to assign expiration data, such as a time to live, to at least a portion of the resources maintained by the respective resource cache component. The assigned time to live may be varied in accordance with the relative position of the logical level within the resource cache component hierarchy 600 and based, at least in part, on resource request parameters. In one embodiment, resource cache components located at a relatively low position within the resource cache component hierarchy 600, such as cache level N of FIGS. 6A-6B, will assign a relatively short time to live to their stored resources, while resource cache components located at a relatively high position within the resource cache component hierarchy 600, such as cache level 1 of FIGS. 6A-6B, will assign a relatively longer time to live to their stored resources.

The tracking components may enable the resource cache components to monitor a residence time for each of the stored resources, which represents a time duration over which each of the resources has been stored by their respective resource cache component from a selected starting time. In one embodiment, the residence time of a resource may be measured starting from the time at which the resource is stored by the resource cache component or the time at which a request for the resource is received by the resource cache component, whichever is more recent.

The resource cache components may further employ the assigned expiration data and monitored residence time in order to make expiration decisions regarding expiration of their stored resources. For example, when the residence time of a resource exceeds the time to live assigned to the resource, the resource may be deleted from the resource cache component. In this manner, because the time to live assigned by resource cache components increases when moving upwards in the resource cache component hierarchy 600, resource cache components will expire from the bottom up within the resource cache component hierarchy 600.

Similarly, in further reference to FIGS. 6A-6B, resources may be maintained at the lower levels of the resource cache component hierarchy or propagated down to the lower levels of the resource cache component hierarchy 600. In another example illustrated in FIG. 6A, assume that a resource request is received by resource cache component 120', which maintains the requested resource in storage. When receiving the resource request, the resource cache component 120' determines that it maintains the requested resource in storage, renews the residence time of the requested resource, and returns the requested resource to the client computing device 102. In this manner, because the residence time of the requested resource may be renewed, the resource will be retained by the resource cache component 120' until such time as the residence time of the resource exceeds the time to live of the resource.

In a further example illustrated in FIG. 6B, assume that a resource request is received by resource cache component 120" which does not initially maintain the requested resource in storage. When receiving the resource request, the resource cache component 120" determines that it does not maintain the requested resource in storage or that a previously stored copy of the resource is no longer valid, or otherwise unknown. Accordingly, the resource cache component 120" requests the resource from a parent resource cache component, such as resource cache component 604. Should the requested resource not be available from the parent resource cache component 604, further requests for the resource will be transmitted up the resource cache component hierarchy to other parent cache components (e.g., resource cache 606), or even to the origin server 112, until a computing device that maintains the requested resource in storage is found.

Upon identification of the requested resource components, the residence time of the requested resource is set at an initial value on the resource cache component in which the requested resource is found. Illustratively, the residence time is set, at least in part, based on the relative location of the resource cache component within the resource cache component hierarchy 600. For example, the top resource cache component 606 can set an initial value for the resident time associated with the requested resource such that the resource will be maintained within the resource cache component hierarchy 600. In one example, the initial value for the resident time associated with the requested resource can be set to a minimum value for each lower level within the resource cache component hierarchy. In this example, resources which are frequently requested may be propagated down to the lower levels of the resource cache component hierarchy. Likewise, resources that are less frequently requested will expire on each of the lower levels of the resource cache component hierarchy 600. Accordingly, upon a subsequent request for the resource (after expiration), the resource can be associated with a longer resident time.

In another example, the initial value for the resident time for the resource maintained at each level in the resource cache component hierarchy 600 can be set to various minimums associated with the specific level of the resource cache component within the hierarchy. In such an embodiment, the resident time can be set in accordance with historical information for that particular resource or for the resource cache component. For example, the resident time may be set at the average resident time for some set of resources stored at the particular resource cache component. In another example, the resident time may be fixed for particular levels of the resource cache component hierarchy 600, such as a minimum resident time for the lowest levels of the resource cache component hierarchy 600, often referred to as the edge of the hierarchy. In such an example, the resident times for resources may or may not be adjusted.

Figure 7A:
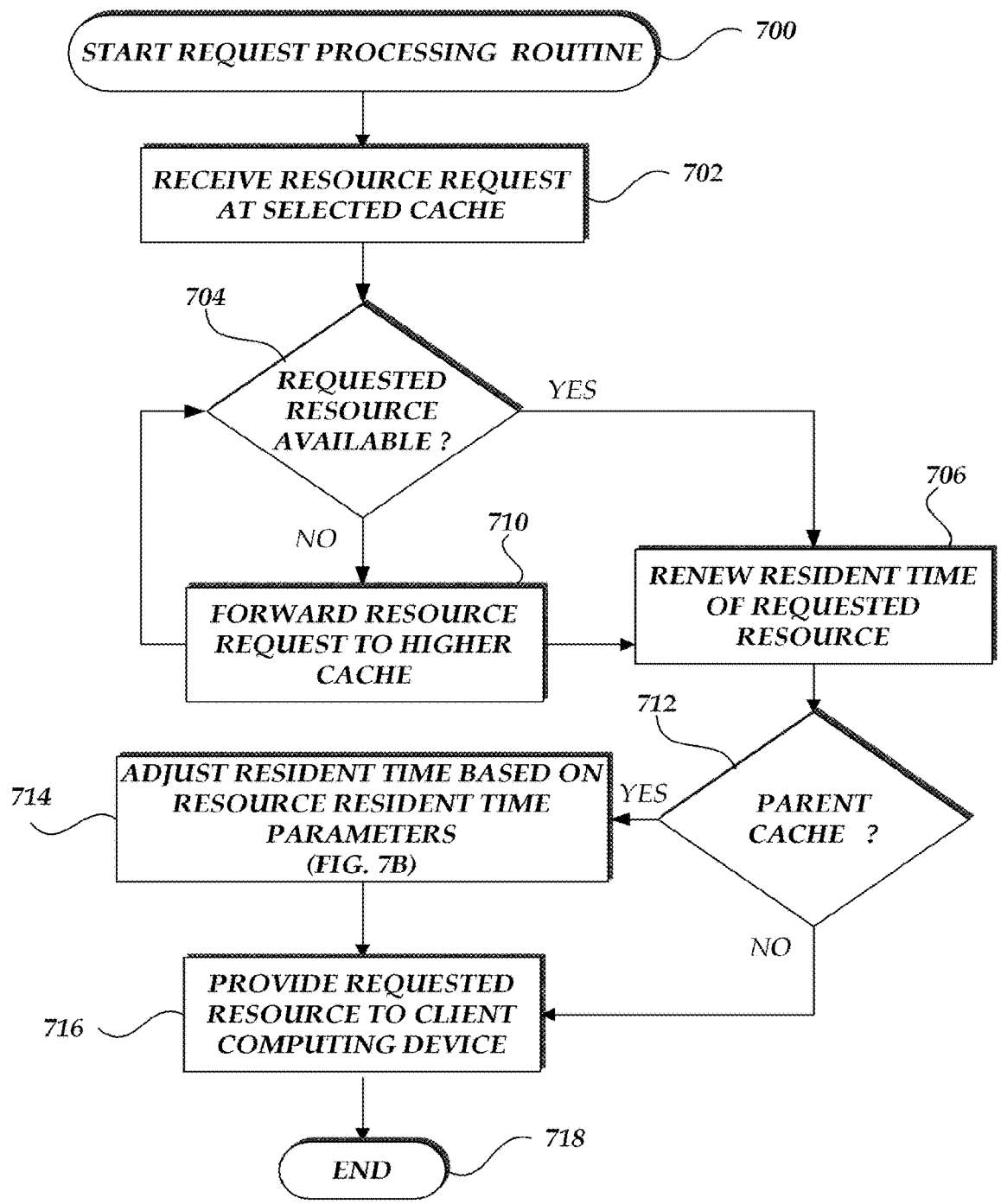
FIG. 7A is a flow diagram illustrating one embodiment of a request processing routine implemented by an embodiment of the hierarchy of cache server components of FIG. 6.

With reference now to FIG. 7A, a request processing routine 700 implemented by a resource cache component to process resource requests will be described. At block 702, a resource request is received at the resource cache component. As previously discussed, the resource request may be transmitted from a client computing device and the requested resource may correspond to an embedded resource in content requested by a client computing device 102 and previously provided by the content provider 104.

At decision block 704, a test is conducted to determine whether the current resource cache component has stored the requested resource. If the current resource cache component maintains the requested resource in storage, the current resource cache component renews the expiration data, such as resident time, at block 706. If, however, at decision block 704, the current resource cache component does not maintain the requested resource in storage, the current resource cache component selects another resource cache component to which a request for the resource is transmitted in block 710. As discussed above, this other resource cache component may include one or more parent resource cache components in communication with the current resource cache component. The test of decision block 704 and the request forwarding operation of block 710 may be repeated, as necessary, with parent resource cache components higher up the resource cache component hierarchy 600 until a resource cache component that maintains the requested resource in storage is identified. The routine 700 then moves to block 706, where the time to live of the requested resource on the identified parent resource cache component is renewed.

The routine 700 subsequently moves to decision block 712, where a test is performed to determine whether the resource computing device that is identified to maintain the requested resource in storage is the resource cache component that originally received the request from the client computing device 102 or a parent resource cache component. In one embodiment, such a determination may be made by review of the resource request. When the original resource cache component forwards a resource request to a parent resource cache component, a record may be stored in the resource request to this effect, allowing the parent resource cache to identify that it is not the original recipient of the resource request.

If the resource computing device that is identified to maintain the requested resource in storage is the resource cache component that is the current resource cache component (e.g., the resource cache component that originally received the request from the client computing device 102), the routine moves to block 716, where the requested resource is transmitted to the client computing device by the current resource cache component.

If, however, the resource computing device that is identified to maintain the requested resource in storage is a parent resource cache component to the current resource cache component, the routine 700 proceeds to block 714. At block 714, the current resource cache component determines whether to adjust the resident time associated with the requested resource. Illustratively, the adjustment is based on the various resource processing parameters and can include increasing the resident time, decreasing the resident time or not adjusting the resident time. An illustrative sub-routine 750 for determining whether to adjust resident time will be described with regard to FIG. 7B (below). The routine moves to block 716, where the requested resource is transmitted to the client computing device by the current resource cache component.

Figure 7B:
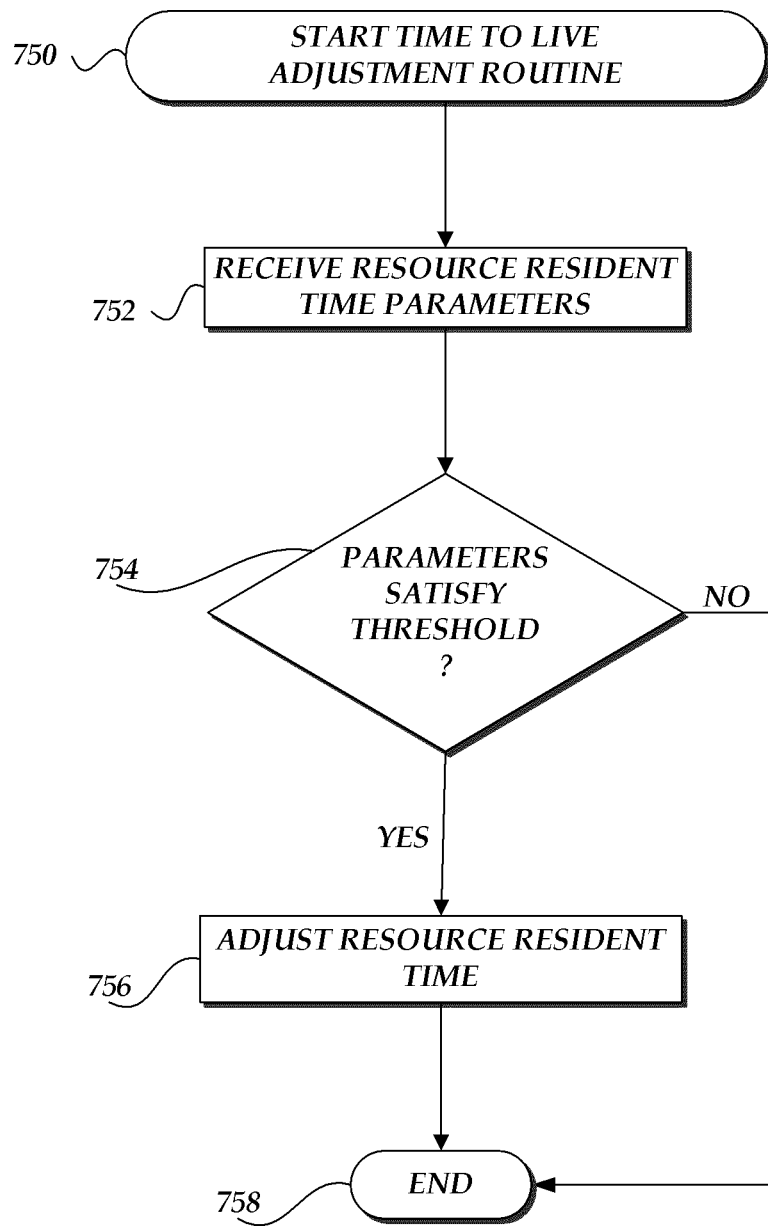
FIG. 7B is a flow diagram illustrating one embodiment of a routine for adjusting resident time assigned to a resource stored by an embodiment of the hierarchy of cache server components of FIG. 6.

With reference now to FIG. 7B, an embodiment of a resident time adjustment routine 750 implemented by a resource cache component will be described. As described above, the routine 750 can be used by a resource cache component to determine whether to adjust a resident time associated with a resource requested by another resource cache component (e.g., the transmitting resource cache component) within a resource cache component hierarchy. At block 752, the resource cache component obtains resource resident time parameters associated with the resource request. As previously described, the resource request parameters correspond to information associated with the specific resource request from the transmitting resource cache component. In one embodiment, the resource request parameters can include a number of requests transmitted by the transmitting resource cache component over a fixed period of time. In another embodiment, the resource request parameters can include a time elapsed since a milestone, such as the time since the last request for the resource or a time since the expiration of the resource. In still further embodiments, the resource request parameters can include information associated with average resident times or default resident times associated with the transmitting resource cache component.

In decision block 754, the resource cache component determines whether the resource resident time parameters satisfy one or more threshold values. If the one or more resource resident time parameter are satisfied, the resource cache component adjusts the resident time for the requested resource at block 756. Alternatively, if the resource resident time parameters are not satisfied, the routine 750 terminates at block 758.

Illustratively, the satisfaction of the one or more threshold values for the resource resident time parameters can correspond to adjustments to increase and decrease the resident time associated with a resource. For example, if the number of requests received within a given time period increases, the resident time of the resource can be increased to indicate a lower popularity resource because the current resident time expires before the subsequent request. Likewise if a threshold amount of time has expired since the last request for the resource, the resource cache component may reset the resident time to a default value or initial value. Still further, in another example, the resource cache component can be limited in the amount of adjustment for the resident time. For example, each level of the resource cache component hierarchy may be associated with a range of resident times that limits the amount of adjustment for the resident times of resource maintained at the specific level in the resource cache server hierarchy.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached FIGURES should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer implemented method comprising:
as implemented by one or more computing devices configured with specific executable instructions,
receiving, at a first cache server component of a set of cache server components, a request from a client computing device for a resource;
responsive to the request, storing the resource at the first cache server component according to initial first expiration data and at a second cache server component of the set of cache server components according to initial second expiration data, wherein the first cache server component and second cache server component are hierarchically arranged such that the second cache server component corresponds to a level of a resource cache component hierarchy higher than the first cache server component;
after expiration of the initial first expiration data, transmitting a request for the resource from the first cache server component to the second cache server component; and
associating updated first expiration data with the resource at the first cache server component based on at least a total number of requests for the resource transmitted by the first cache server component to the second cache server component.

2. The computer implemented method of claim 1, wherein the initial first and second expiration data correspond to a specification of time.

3. The computer implemented method of claim 1, wherein the updated first expiration data corresponds to an increase in the expiration data.

4. The computer implemented method of claim 1, wherein the updated first expiration data corresponds to a decrease in the expiration data.

5. The computer implemented method of claim 1, wherein the updated first expiration data corresponds to a modification of the expiration data within a range of values.

6. The computer implemented method of claim 5, wherein the range of values corresponds to the level of the resource cache component hierarchy associated with the first cache server component.

7. The computer implemented method of claim 6, wherein the range of values is shorter at the lowest levels of the resource cache component hierarchy.

8. The computer implemented method of claim 1, wherein the updated first expiration data is based on the relationship of the first cache server component relative to other cache server components in the resource cache component hierarchy.

9. The computer implemented method of claim 8, wherein associating the updated first expiration data comprises assigning shorter expiration data of the resource at the first cache server component than at cache server components at successively higher levels of the resource cache component hierarchy.

10. The computer implemented method of claim 1, wherein the updated first expiration data is further based on a time elapsed from the receipt of the transmission of the request from the first cache server component.

11. A computer implemented storage system comprising:
a service provider that receives requests from a client computing device for a resource; and
a set of cache server components associated with the service provider, the set of cache server components having a first cache server component and a second cache server component, wherein the first cache server component and the second cache server component are hierarchically arranged such that the second cache server component corresponds to a level of a resource cache component hierarchy higher than the first cache server component; the set of cache server components operative to:
upon receipt of a request for a resource at the first cache server component of the set of cache server components, store the resource at the first cache server component according to initial first expiration data and at the second cache server component according to initial second expiration data;
after expiration of the initial first expiration data, transmit a request for the resource from the first cache server component to the second cache server component; and
associate updated first expiration data with the resource at the first cache server component based on at least a time elapsed from the receipt of the transmission of the request from the first cache server component.

12. The computer implemented storage system of claim 11, wherein the initial first and second expiration data correspond to a specification of time.

13. The computer implemented storage system of claim 11, wherein the updated first expiration data corresponds to an increase in the expiration data.

14. The computer implemented storage system of claim 11, wherein the updated first expiration data corresponds to a decrease in the expiration data.

15. The computer implemented storage system of claim 11, wherein the updated first expiration data corresponds to a modification of the expiration data within a range of values.

16. The computer implemented storage system of claim 15, wherein the range of values corresponds to the level of the resource cache component hierarchy associated with the first resource cache component.

17. The computer implemented storage system of claim 16, wherein the range of values is shorter at the lowest levels of the resource cache component hierarchy.

18. The computer implemented storage system of claim 11, wherein the updated first expiration data is based on the relationship of the first cache server component relative to other cache server components in the resource cache component hierarchy.

19. The computer implemented storage system of claim 18, wherein associating the updated first expiration data comprises assigning shorter expiration data of the resource at the first cache server component than at cache server components at successively higher levels of the resource cache component hierarchy.

20. The computer implemented storage system of claim 11, wherein the updated first expiration data is further based on a total number of requests for the resource transmitted by the first cache server component to the second cache server component.

\* \* \* \* \*